US011455836B2

(12) United States Patent
Du et al.

(10) Patent No.: US 11,455,836 B2
(45) Date of Patent: Sep. 27, 2022

(54) DYNAMIC MOTION DETECTION METHOD AND APPARATUS, AND STORAGE MEDIUM

(71) Applicant: Shanghai SenseTime Intelligent Technology Co., Ltd., Shanghai (CN)

(72) Inventors: Tianyuan Du, Shanghai (CN); Chendi Yu, Shanghai (CN); Yadi Yang, Shanghai (CN)

(73) Assignee: Shanghai SenseTime Intelligent Technology Co., Ltd., Shanghai (CN)

( * ) Notice: Subject to any disclaimer, the term of this patent is extended or adjusted under 35 U.S.C. 154(b) by 0 days.

(21) Appl. No.: 17/257,136

(22) PCT Filed: Jun. 28, 2019

(86) PCT No.: PCT/CN2019/093583
§ 371 (c)(1),
(2) Date: Dec. 30, 2020

(87) PCT Pub. No.: WO2020/038108
PCT Pub. Date: Feb. 27, 2020

(65) Prior Publication Data
US 2021/0248359 A1 Aug. 12, 2021

(30) Foreign Application Priority Data
Aug. 24, 2018 (CN) ......................... 201810974244.8

(51) Int. Cl.
*G06K 9/00* (2022.01)
*G06V 40/20* (2022.01)
(Continued)

(52) U.S. Cl.
CPC ........... *G06V 40/28* (2022.01); *G06K 9/6215* (2013.01); *G06T 7/246* (2017.01); *G06V 20/40* (2022.01);
(Continued)

(58) Field of Classification Search
None
See application file for complete search history.

(56) References Cited

U.S. PATENT DOCUMENTS

2005/0271279 A1* 12/2005 Fujimura ........... G06K 9/00389 382/203
2007/0057912 A1 3/2007 Romriell et al.
(Continued)

FOREIGN PATENT DOCUMENTS

CN 102053702 5/2011
CN 102222431 10/2011
(Continued)

OTHER PUBLICATIONS

CNIPA, Office Action fsyrf Dec. 2, 2019, in CN 201810974244.8 with English translation, 14 pgs.
(Continued)

*Primary Examiner* — Soo Jin Park
(74) *Attorney, Agent, or Firm* — Henry Patent Law Firm PLLC

(57) ABSTRACT

The present disclosure relates to methods and apparatuses for dynamic action detection and dynamic action control. A dynamic action detection method includes: adding an image frame in a video stream into a first queue, to obtain the first queue with a partially updated image frame; detecting a dynamic action in the partially updated image frame; and in response to the dynamic action not matching with the action detection result, updating an action detection result according to the dynamic action, the action detection result including an action reference result or a previously detected action detection result. A dynamic action detection in the present disclosure is executed according to the partially updated image frame in the first queue, so that the dynamic action can be detected more timely; and the dynamic action can
(Continued)

also be rapidly determined, so that the action detection result is more accurate and the detection efficiency is higher.

20 Claims, 6 Drawing Sheets

(51) Int. Cl.
*G06T 7/246* (2017.01)
*G06K 9/62* (2022.01)
*G06V 20/40* (2022.01)

(52) U.S. Cl.
CPC ............... *G06T 2207/10016* (2013.01); *G06T 2207/30196* (2013.01)

(56) References Cited

U.S. PATENT DOCUMENTS

| | | | | |
|---|---|---|---|---|
| 2011/0135148 | A1* | 6/2011 | Hsiao | G06K 9/00355 382/103 |
| 2013/0300749 | A1 | 11/2013 | Harada | |
| 2015/0309579 | A1 | 10/2015 | Wang et al. | |
| 2016/0162148 | A1 | 6/2016 | Murphy et al. | |
| 2017/0142336 | A1 | 5/2017 | Muto | |
| 2019/0102044 | A1* | 4/2019 | Wang | H04N 5/232 |

FOREIGN PATENT DOCUMENTS

| | | |
|---|---|---|
| CN | 102609093 | 7/2012 |
| CN | 105894540 | 8/2016 |
| CN | 106648112 | 5/2017 |
| CN | 107169411 | 9/2017 |
| CN | 108197596 | 6/2018 |
| CN | 109144260 | 1/2019 |
| CN | 109144260 B | 8/2020 |
| JP | 2004199623 | 7/2004 |
| WO | 2009049314 | 4/2009 |
| WO | 2020038108 | 2/2020 |

OTHER PUBLICATIONS

WIPO, International Search Report and Written Opinion dated Oct. 9, 2019, in PCT/CN2019/093583, 2 pgs.

* cited by examiner

DYNAMIC MOTION DETECTION METHOD AND APPARATUS, AND STORAGE MEDIUM

CROSS-REFERENCE TO RELATED APPLICATIONS

The present application is a national stage entry of PCT/CN2019/093583, filed Jun. 28, 2019, and entitled "DYNAMIC MOTION DETECTION METHOD AND DYNAMIC MOTION CONTROL METHOD AND DEVICE" which claims priority to Chinese Patent Application No. 201810974244.8, filed with the Chinese Patent Office on Aug. 24, 2018, and entitled "DYNAMIC ACTION DETECTION METHODS AND APPARATUSES, AND DYNAMIC ACTION CONTROL METHODS AND APPARATUSES", the contents of which are incorporated herein by reference in their entirety.

TECHNICAL FIELD

The present disclosure relates to the technical field of image processing, and in particular, to dynamic action detection methods and apparatuses, and dynamic action control methods and apparatuses.

BACKGROUND

As needs for human-computer interaction increase, needs for applications for detecting a dynamic action of an operator and using the detected dynamic action to control a device become more and more.

SUMMARY

The present disclosure provides a dynamic action detection technical solution.

An aspect of the present disclosure provides a dynamic action detection method, which includes: adding an image frame in a video stream into a first queue, to obtain the first queue with a partially updated image frame; detecting a dynamic action in the partially updated image frame in the first queue; and updating an action detection result according to the dynamic action under the condition that the dynamic action does not match with the action detection result, the action detection result including an action reference result or a previously detected action detection result.

An aspect of the present disclosure provides a dynamic action control method, which includes: obtaining a video stream; determining an action detection result in the video stream by using the method according to any one above; and controlling a device to execute an operation corresponding to the action detection result.

An aspect of the present disclosure provides a dynamic action detection apparatus, which includes: a first queue update module, configured to add an image frame in a video stream into a first queue, to obtain the first queue with a partially updated image frame; a dynamic action detection module, configured to detect a dynamic action in the partially updated image frame in the first queue; and an action detection result update module, configured to update an action detection result according to the dynamic action under the condition that the dynamic action does not match with the action detection result, the action detection result including an action reference result or a previously detected action detection result.

An aspect of the present disclosure provides a dynamic action control apparatus, which includes: a video stream obtaining module, configured to obtain a video stream; an action detection result obtaining module, configured to determine an action detection result in the video stream by using the apparatus according to any one above; and an operation execution module, configured to control a device to execute an operation corresponding to the action detection result.

An aspect of the present disclosure provides an electronic device, including: a processor; and a memory configured to store processor executable instructions, where the processor is configured to: execute the dynamic action detection method and/or the dynamic action control method.

An aspect of the present disclosure provides a computer readable storage medium, having a computer program instruction stored thereon, where when the computer program instruction is executed by a processor, the dynamic action detection method and/or the dynamic action control method are implemented.

An aspect of the present disclosure provides a computer program, including a computer readable code, where when the computer readable code runs in an electronic device, a processor in the electronic device executes the dynamic action detection method and/or the dynamic action control method.

In embodiments of the present disclosure, the image frame in the video stream can be added into the first queue, to obtain the first queue with a partially updated image frame; the dynamic action in the partially updated image frame in the first queue is detected; and the action detection result is updated according to the dynamic action under the condition that the dynamic action does not match with the action detection result. In the embodiments of the present disclosure, the dynamic action detection can be executed according to the partially updated image frame in the first queue without waiting for all image frames in the first queue are updated, so that the dynamic action in the video stream can be detected more timely. When a starting frame or an ending frame of the dynamic action is added into the first queue, the dynamic action detection is executed according to the partially updated image frame in the first queue; the dynamic action can also be rapidly determined according to the starting frame or the ending frame of the dynamic action, so that the detection result of the dynamic action is more accurate and the detection efficiency is higher. The embodiments of the present disclosure may implement real-time tracking of the dynamic action in the video stream.

It should be understood that the above general description and the following detailed description are merely exemplary and explanatory, and are not intended to limit the present disclosure. Other features and aspects of the present disclosure can be described more clearly according to the detailed descriptions of the exemplary embodiments in the accompanying drawings below.

BRIEF DESCRIPTION OF THE DRAWINGS

The drawings here incorporated in the specification and constituting a part of the specification describe the embodiments of the present disclosure and are intended to explain the technical solutions of the present disclosure together with the specification.

DETAILED DESCRIPTION

Figure 1:
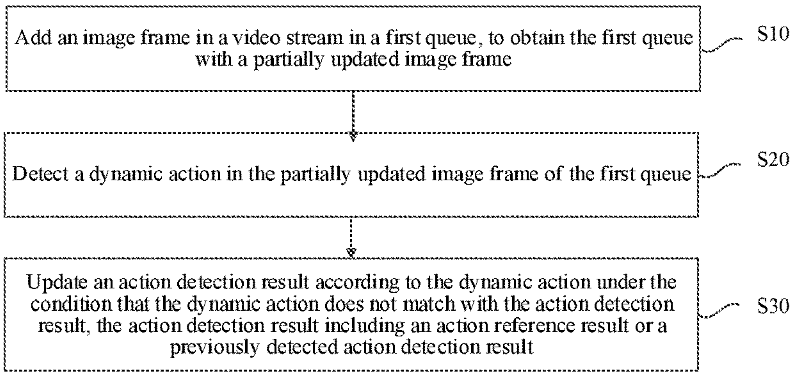
FIG. 1 shows a flowchart of a dynamic action detection method according to embodiments of the present disclosure.

Various exemplary embodiments, features, and aspects of the present disclosure are described below in detail with reference to the accompanying drawings. The same reference numerals in the accompanying drawings represent elements having the same or similar functions. Although the various aspects of the embodiments are illustrated in the accompanying drawings, unless stated particularly, it is not required to draw the accompanying drawings in proportion. The special word "exemplary" here means "used as examples, embodiments, or descriptions". Any "exemplary" embodiment given here is not necessarily construed as being superior to or better than other embodiments. The term "and/or" as used herein is merely the association relationship describing the associated objects, indicating that there may be three relationships, for example, A and/or B, which may indicate that A exists separately, and both A and B exist, and B exists separately. In addition, the term "at least one" as used herein means any one of multiple elements or any combination of at least two of the multiple elements, for example, including at least one of A, B, or C, which indicates that any one or more elements selected from a set consisting of A, B, and C are included. In addition, numerous details are given in the following detailed description for the purpose of better explaining the present disclosure. It should be understood by persons skilled in the art that the present disclosure can still be implemented even without some of those details. In some examples, methods, means, elements, and circuits that are well known to persons skilled in the art are not described in detail so that the principle of the present disclosure becomes apparent.

FIG. 1 shows a flowchart of a dynamic action detection method according to embodiments of the present disclosure. The dynamic action detection method can be executed by electronic devices such as terminal devices or servers, where the terminal devices may be a User Equipment (UE), a mobile device, a user terminal, a terminal, a cellular phone, a cordless phone, a Personal Digital Assistant (PDA), a handheld device, a computing device, a vehicle-mounted device, a wearable device, etc. In some possible implementations, the dynamic action detection method may be implemented by means of invoking, by the processor, the computer readable instruction stored in the memory.

As shown in FIG. 1, the dynamic action detection method includes:

Step S10: an image frame is added in a video stream in a first queue, to obtain the first queue with a partially updated image frame.

In a possible implementation, in conventional dynamic action detection methods, the set number of image frames need to be captured for dynamic action detection; after the detection is completed, the set number of image frames need to be further captured for the next dynamic action detection. Instantaneity for the dynamic action detection is weak.

In a possible implementation, the minimum number of the image frames for dynamic action detection is determined as the length of the first queue. For example, for the dynamic action of extending an index finger to slide rightwards, the static actions of the hand in multiple image frames are all extending the index finger. When executing the dynamic action detection according to less than N image frames, the number of the image frame is too small, the change of the static action in a spatial position is also too small, and therefore, the change of the static action in the spatial position cannot be determined, that is, the dynamic action detection cannot be performed, either. When executing the dynamic action detection according to greater than or equal to N image frames, the change of the static action of extending the index finger in the spatial position is sliding rightwards can be determined, and therefore, N is the minimum number of the image frames for dynamic action detection. N is determined as the length of the first queue, where N is a positive integer. In a possible implementation, the length of the first queue can be determined according to the content in the video stream, the accuracy requirements of the dynamic action detection, the speed requirements of the dynamic action detection, or an earlier experience value. The present disclosure does not limit the length of the first queue. For example, the value range of N can be: $2 \le N \le 100$, or $10 \le N \le 200$, etc. The value of N can be determined according to requirements.

In a possible implementation, the image frames in the video stream are sequentially added into the first queue, and the first queue is partially updated. When a new image frame is added into the first queue, the image frame can be added from a rear end of the first queue, and the image frame at the first front end of the first queue is moved out so that the preset number of the image frames in the first queues is maintained. In a possible implementation, one image frame in the video stream is added into the first queue, to obtain the first queue with a partially updated image frame. Multiple image frames less than the first queue length in the vide stream are added into the first queue, to obtain the first queue with a partially updated image frame.

Step S20, a dynamic action in the partially updated image frame in the first queue is detected.

In a possible implementation, detection is performed using the partially updated image frame in the first queue, to determine the dynamic action in each image frame. The partially updated image frame in the first queue is input into a neural network, to detect the dynamic action in the image frame in the first queue by means of the neural network. In a possible implementation, under the condition that the first queue is not fully filled, dynamic action detection is not performed on the image frame in the first queue, to save system resources.

In a possible implementation, the execution object of the dynamic action includes various movable objects such as human, animals, or robots. The dynamic action includes a change in a relative position a setting part of the execution object generated with respect to an environment where it is located. For example, the dynamic action includes an action made by a human using sliding of the index finger, includes an action of running made by a human using four limbs, and also includes an action of moving front and back made by a robot using a configured movable device. The present disclosure does not limit the execution object of the dynamic action, and does not limit the type of the dynamic action, either.

Step S30, an action detection result is updated according to the dynamic action under the condition that the dynamic action does not match with the action detection result, the action detection result including an action reference result or a previously detected action detection result.

In a possible implementation, the image frame in a video frame includes multiple dynamic actions. The previously detected action detection result is considered to be the action detection result of the video stream. For example, three actions are identified from the image frame of the video frame 1, which are sequentially action 1, action 2, and action 3. When action 1 is identified, action 1 is determined as the previously detected action detection result as the action detection result. When action 2 is identified, the action detection result is updated as action 2; when action 3 is identified, the action detection result is updated as action 3. In a possible implementation, the action detection result also includes an action reference result. A given action is set as an action reference result and the action reference result is set as empty.

In a possible implementation, dynamic actions in the image frames of the multiple video streams are analyzed and the action detection result is updated according to the multiple dynamic actions in the image frames of the multiple video streams. For example, the dynamic action detection is performed on video streams 1 and 2 sequentially. Actions 1 and 2 are identified from the image frame in video stream 1, and actions 3 and 4 are identified from the image frame in video stream 2. When action 1 is identified from the image frame of video stream 1, action 1 is used as the action detection result. When action 2 is identified from the image frame of video stream 1, the action detection result is updated as action 2. Action identification is further executed according to the image frame of video stream 2, and when action 4 is identified, the action detection result is updated as action 3. When action 4 is identified, the action detection result is updated as action 4. One or more video streams for the dynamic action detection are obtained according to requirements. The action detection result of the video stream is obtained after performing the dynamic action detection according to the image frame of the video stream itself, and is also obtained after performing the dynamic action detection according to the image frame in other video streams.

In a possible implementation, under the condition that the dynamic action does not match with the action detection result, it represents a new action is determined according to the image frame in the video stream, and the action detection result is updated using the new action so that the action detection result is updated in time.

In a possible implementation, the action detection result in the embodiments of the present disclosure is used for tracking the action of the execution object in real time. The video stream of a device operation can be photographed; the dynamic action detection method in the embodiments of the present disclosure is used for obtaining the action detection result of the photographed video stream and controlling the device according to the action detection result. The instantaneity of the action detection result enables the device operation to accurately control the device.

In the present disclosure, the image frame in the video stream can be added into the first queue, to obtain the first queue with a partially updated image frame; the dynamic action in the partially updated image frame in the first queue is detected; and the action detection result is updated according to the dynamic action under the condition that the dynamic action does not match with the action detection result. In the embodiments of the present disclosure, the dynamic action detection can be executed according to the partially updated image frame in the first queue without waiting for all image frames in the first queue are updated, so that the dynamic action in the video stream can be detected more timely. When a starting frame or an ending frame of the dynamic action is added into the first queue, the dynamic action detection is executed according to the partially updated image frame in the first queue; the dynamic action can also be rapidly determined according to the starting frame or the ending frame of the dynamic action, so that the detection result of the dynamic action is more accurate and the detection efficiency is higher. The embodiments of the present disclosure may implement real-time tracking of the dynamic action in the video stream.

Figure 2:
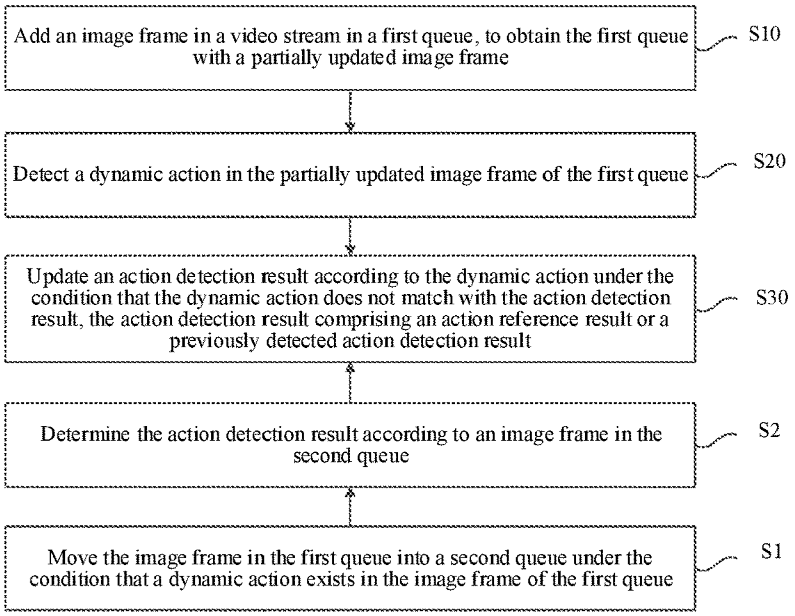
FIG. 2 shows a flowchart of a dynamic action detection method according to embodiments of the present disclosure.

FIG. 2 shows a flowchart of a dynamic action detection method according to embodiments of the present disclosure. As shown in FIG. 2, in the dynamic action detection method, the previously detected action detection result obtaining method includes: step S1: the image frame in the first queue is moved to the second queue under the condition that a dynamic action exists in the image frame of the first queue.

Step S2: the action detection result is determined according to an image frame in the second queue.

In a possible implementation, in an initial state, the previously detected action detection result is obtained. In the initial state, the first queue and the second queue are empty, and the action detection result is no action. In the initial state, the image frame in the video stream is input into the first queue, and the action detection result determined according to the image frame in the first queue is used as the previously detected action detection result. In a possible implementation, in the initial state, starting from the first image frame in the video stream, dynamic action detection can be executed. Dynamic action detection is also performed on the image frame including the execution object detected in the video stream. No limitation is made thereto in the present disclosure. In a possible implementation, the image frames in the video stream can be sequentially added into the first queue according to the sequential order of the time until the first queue may be subjected to the dynamic action detection.

In a possible implementation, the length of the second queue is equal to the length of the first queue, and is also be unequal to the length of the first queue. The image frames in the first queue are all moved into the second queue and the first queue is emptied under the condition that it is determined that a dynamic action exists in the image frame of the first queue. The action detection result is determined according to a dynamic action in the image frames in the second queue.

In a possible implementation, after the image frames in the first queue are moved into the second queue, the number of the image frames in the first queue is 0, and the previously detected action detection result is obtained. After the initial state ends, the method in the embodiments as shown in FIG. 1 is used: partially updating the first queue successively according to each subsequent image frame to be identified and updating the action detection result according to the detected dynamic action in the partially updated image frame in the first queue.

In the embodiment, the previously detected action detection result obtaining method includes adding the image frames in the video stream into the first queue in sequence. Under the condition that the dynamic action exists in the image frame of the first queue, the image frame in the first queue is moved into the second queue, and the action detection result is obtained according to the action in the image frame in the second queue. The previously detected action detection result is the dynamic action in the video stream, the image frame with the action detection result is kept using the second queue, and the instantaneity and accuracy of action identification can be improved.

Figure 3:
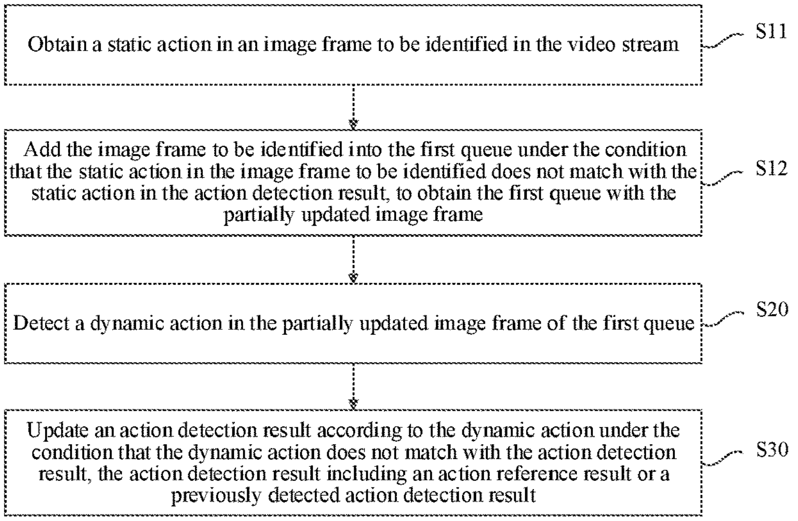
FIG. 3 shows a flowchart of a dynamic action detection method according to embodiments of the present disclosure.

FIG. 3 shows a flowchart of a dynamic action detection method according to embodiments of the present disclosure. The action detection result includes a static action. As shown in FIG. 3, step S10 in the dynamic action detection method includes the following steps. Step S11, the static action in the image frame to be identified in the video stream is obtained. Step S12, the image frame to be identified is added into the first queue under the condition that the static action in the image frame to be identified does not match with the static action in the action detection result, to obtain the first queue with the partially updated image frame.

In a possible implementation, after obtaining the previously detected action detection result, the first queue is empty and the second queue has image frames. The image frame without dynamic action detection in the video stream is used as the image frame to be identified.

In a possible implementation, the dynamic action includes the static action and the static action trajectory. For example, dynamic action 1 is “extended index finger sliding rightwards”, the static action included in dynamic action 1 is extending the index finger; the action trajectory of the static action is sliding rightwards. In a possible implementation, the dynamic action includes the static action and the switching information of the static action. The switching information of the static action includes switching information between two static actions. For example, dynamic action 2 is “a fist into a palm”; dynamic action 2 includes the static action 1: palm, and static action 2: fist; the switching information of dynamic action 2 is switching the fist into the palm.

In a possible implementation, the dynamic action includes the static action, the switching information of the static action, the action trajectory of the static action. For example, dynamic action 3 is “a jumping action”; dynamic action 3 includes static action 1: running and static action 2: jumping; the action trajectory of static action 1 is rightwards, the action trajectory of static action 2 is rightwards, and the switching information between the static actions of dynamic action 3 is switching from running to jumping.

In a possible implementation, the static action can be detected in each image frame to be identified. The static actions in the multiple image frames correspond to the dynamic action match with the static action in the dynamic action. The static actions in at least two image frames are compared to obtain the action trajectory and/or switching information of the static action in the image frame. The action trajectory and/or switching information of the static action in the multiple image frames corresponding to a dynamic action matches with the action trajectory and/or switching information in the dynamic action.

In a possible implementation, the static action in each image frame to be identified in the video stream is detected in sequence, and the static action in each image frame to be identified and the static action in the action detection result are matched. The static action in each image frame to be identified matches with the static action in the image frame in the second queue. For example, the action detection result is extended index finger slides rightwards, and whether the static action of the index finger in the image frame to be identified matches with the static action of the index finger in the action detection result is detected.

In a possible implementation, if the static action in the image frame to be identified does not match with the static action in the action detection result, the image frame to be identified is added to the first queue. The image frame to be identified is added to a rear end of the first queue and the image frame at the first front end of the first queue is moved out to partially update the first queue. The dynamic action in the partially updated image frame in the first queue is detected, and under the condition that the detected dynamic action does not match the action detection result, the action detection result is updated according to the dynamic action.

In the embodiments, the static action in the image frame to be identified in the video stream is obtained; under the condition that the static action in the image frame to be identified does not match with the static action in the action detection result, the image frame to be identified is added into the first queue. The process of detecting the static action in the image frame is simple and reliable, and the image frame to be identified is rapidly added into the first queue, so as to rapidly and partially update the first queue to improve the detection efficiency of the dynamic action.

Figure 4:
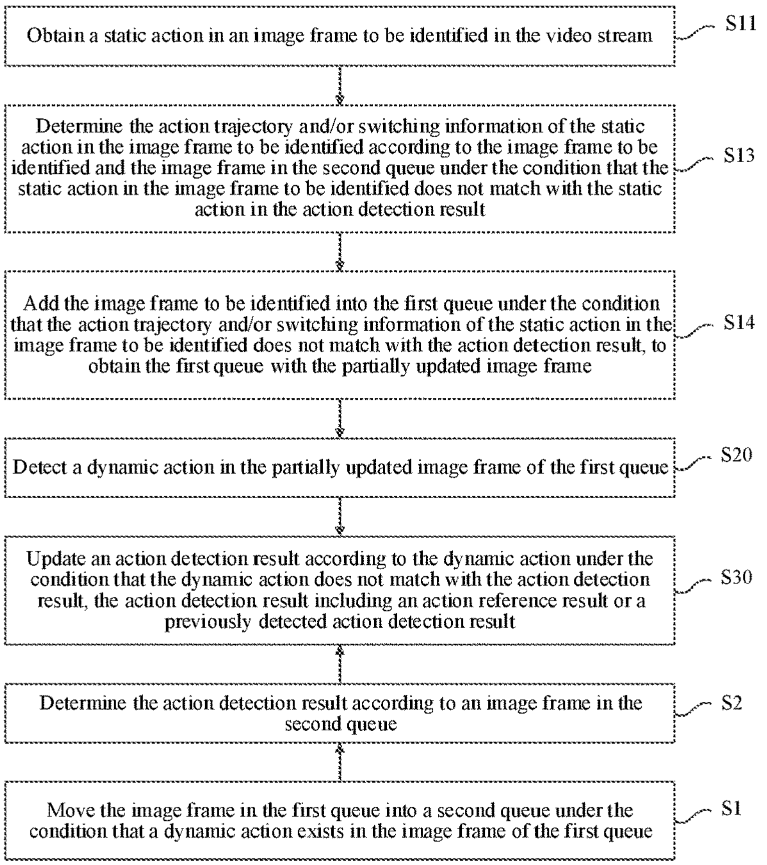
FIG. 4 shows a flowchart of a dynamic action detection method according to embodiments of the present disclosure.

FIG. 4 shows a flowchart of a dynamic action detection method according to embodiments of the present disclosure. The action detection result further includes the action trajectory and/or switching information of the static action; as shown in FIG. 4, step S10 in the dynamic action detection method includes:

Step S13: the action trajectory and/or switching information of the static action in the image frame to be identified are determined according to the image frame to be identified and the image frame in the second queue under the condition that the static action in the image frame to be identified does not match with the static action in the action detection result.

Step S14: the image frame to be identified is added into the first queue under the condition that the action trajectory and/or switching information of the static action in the image frame to be identified does not match with the action detection result, to obtain the first queue with the partially updated image frame.

In a possible implementation, the dynamic action further includes the action trajectory and/or the switching information of the static action. The action trajectory and/or switching information of the static action in the image frame to be identified are determined according to the image frame to be identified and the last image frame or multiple image frames in the second queue under the condition that the static action in the image frame to be identified does not match with the static action in the action detection result. According to a position difference between static action 1 in the image frame to be identified and static action 2 in the last image frame in the second queue, the action trajectory and/or switching information of static action 2 with respect to static action 1 are obtained. For example, the action detection result is dynamic action 1: extended index finger sliding rightwards"; the static action in the image frame to be identified is extending the index finger and matches with the action detection result. According to the position difference between the static action in the image frame to be identified and the static action in the image frame in the second queue, the index finger in the image frame to be identified is determined to be sliding leftwards, the action trajectory of the static action in the image frame to be identified does not match the action detection result.

In a possible implementation, under the condition that the action trajectory and/or switching information of the static action in the image frame to be identified do not match the action detection result, it is considered that the dynamic action to which the static action belongs in the image frame to be identified does not match with the action detection result. The image frame to be identified is added into the first queue and the first queue is partially updated. The dynamic action in the partially updated image frame in the first queue is detected, and under the condition that the detected dynamic action does not match the action detection result, the action detection result is updated according to the dynamic action.

In the embodiments, the image frame to be identified is added into the first queue under the condition that the action trajectory and/or switching information of the static action in the image frame to be identified does not match with the action detection result, to obtain the first queue with the partially updated image frame. According to the action trajectory and/or switching information, whether the dynamic action to which the static action belongs in the image frame to be identified matches with the action detection result is determined, so as to improve the accuracy of the action detection result.

Figure 5:
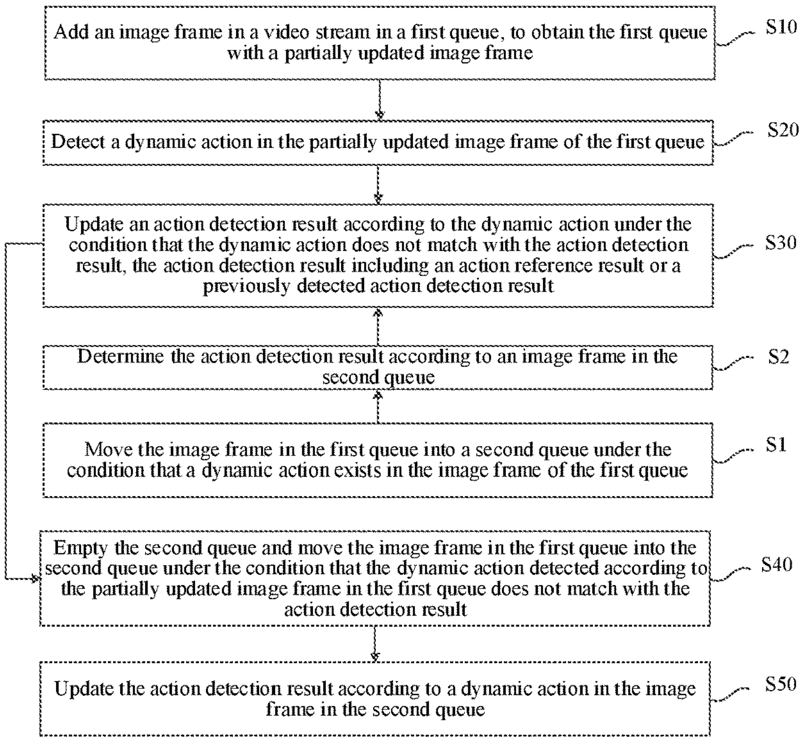
FIG. 5 shows a flowchart of a dynamic action detection method according to embodiments of the present disclosure.

FIG. 5 shows a flowchart of a dynamic action detection method according to embodiments of the present disclosure. As shown in FIG. 5, the dynamic action detection method further includes:

Step S40: the second queue is emptied and the image frame in the first queue is moved into the second queue under the condition that the dynamic action detected according to the partially updated image frame in the first queue does not match with the action detection result.

Step S50: the action detection result is updated according to a dynamic action in the image frame in the second queue.

In a possible implementation, the dynamic action in the partially updated image frame in the first queue is detected. The static action in the partially updated image frame in the first queue and the action trajectory and/or switching information of the static action are detected; according to the detected static action and the action trajectory and/or switching information of the static action, the dynamic action is determined; when the dynamic action in the partially updated image frame in the first queue does not match with the action detection result, it is considered that a new dynamic action appears in the partially updated image frame in the first queue.

In a possible implementation, when the new dynamic action appears in the partially updated image frame in the first queue, the second queue is emptied; all the image frames in the first queue are moved into the second queue; and the action detection result is updated according to the dynamic action in the image frame in the updated second queue.

In a possible implementation, the video stream obtained by means of photographing is subjected to real-time dynamic action detection and control of the electronic device is executed according to the dynamic action obtained by means of real-time detection. The static action in the image frame to be identified in the video stream and the action trajectory and/or switching information of the static action are detected for whether they match with the action detection result; if not, the image frame to be identified is added into the first queue to partially update the first queue. When the new dynamic action appears in the partially updated image frame in the first queue is detected, the second queue is emptied; all the image frames in the first queue are moved into the second queue, and according to the dynamic action in the image frame in the updated second queue, the action detection result is updated. Real-time analysis is performed on each image frame in the video steam to improve the instantaneity and accuracy of the dynamic action detection.

Figure 6:
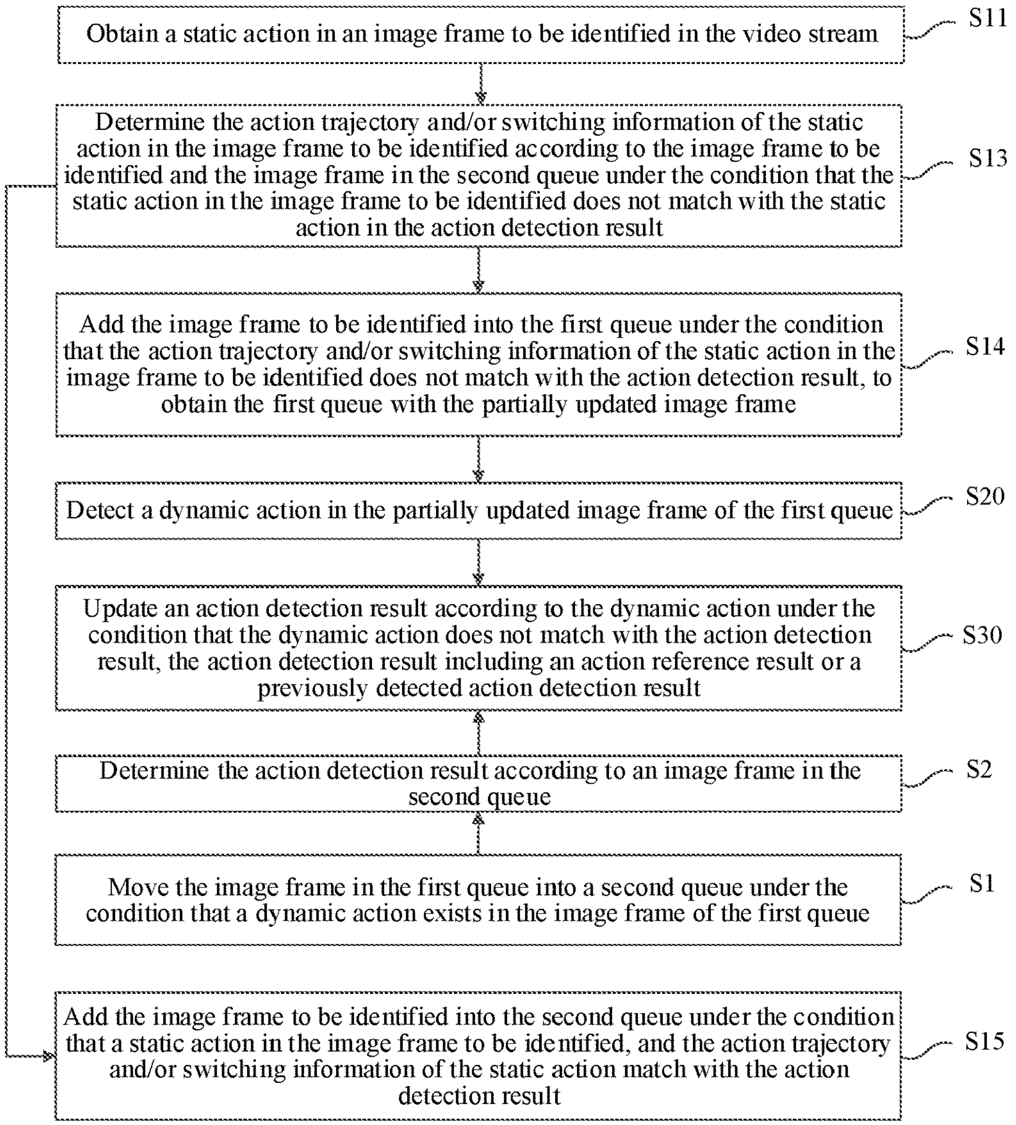
FIG. 6 shows a flowchart of a dynamic action detection method according to embodiments of the present disclosure.

FIG. 6 shows a flowchart of a dynamic action detection method according to embodiments of the present disclosure. As shown in FIG. 6, the dynamic action detection method further includes:

Step S15: the image frame to be identified is added into the second queue under the condition that a static action in the image frame to be identified, and the action trajectory and/or switching information of the static action match with the action detection result.

In a possible implementation, the static action in the image frame to be identified matches with the static action in the action detection result; under the condition that the action trajectory and/or the switching information of the static action in the image frame to be identified also match with the action trajectory and/or the switching information of the static action in the action detection result, the dynamic action to which the static action belongs in the image frame to be identified matches with the action detection result. In a possible implementation, the image frame to be identified is added into the second queue under the condition that a static action in the image frame to be identified, and the action trajectory and/or switching information of the static action match with the action detection result. The image frame to be identified is added into the rear end of the second queue, and the image frame at the first front end of the second queue is moved out, so that the image frames in the second queue are maintained in the preset number. The dynamic action has continuity; in multiple continuous image frames corresponding to a dynamic action, the static actions and the action trajectory and/or switching information in two image frames apart from each other in a long distance may differ greatly. The image frame to be identified that match with the action detection result is added into the second queue, the instantaneity of the dynamic action in the image frame in the second queue is maintained, so that the dynamic action detection result of the subsequent image frame is more accurate.

In a possible implementation, the first queue is used for detecting the dynamic action in the subsequent image frame to be identified in the video stream. The second queue is used for storing the image frame for determining the action detection result. Before the image frame to be identified in the video stream is added into the first queue, it can be determined together with the image frame in the second queue, to determine whether the image frame to be identified has the dynamic action matched with the action detection result. If the image frame to be identified has the dynamic action matched with the action detection result, it is added into the second queue, so that the continuity of the dynamic action in the image frame in the second queue is ensured, so as to improve the accuracy of the dynamic action detection result. If the image frame to be identified does not have the dynamic action matched with the action detection result, it is added into the first queue, so that the image frame in the first queue is used for detecting a new dynamic action so as to improve the timeliness of the dynamic action detection. By means of the settings of the first queue and the second queue, the embodiments of the present disclosure can implement accurate and high efficient real-time tracking of the dynamic action in the video stream.

In the embodiments, the image frame to be identified is added into the second queue under the condition that a static action in the image frame to be identified, and the action trajectory and/or switching information of the static action match with the action detection result. The image frame that match with the action detection result is added into the second queue, the instantaneity of the dynamic action in the image frame in the second queue is maintained, so that the dynamic action detection result of the subsequent image frame is more accurate.

Figure 7:
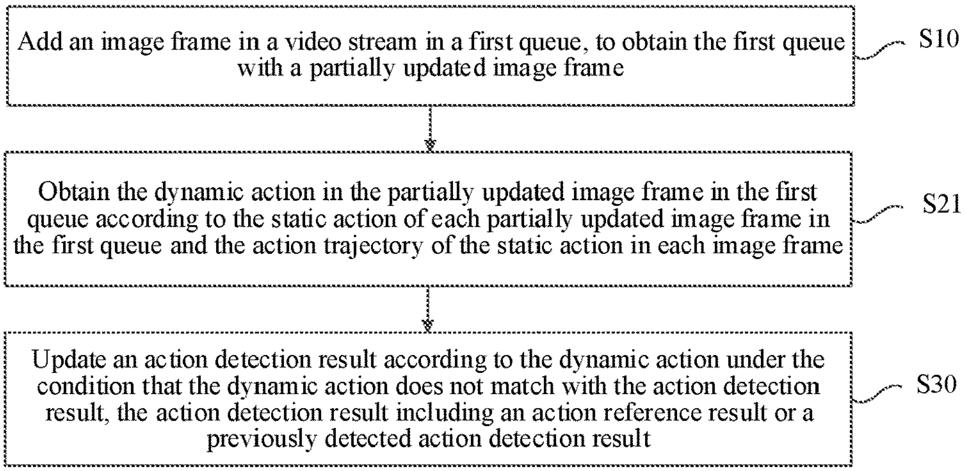
FIG. 7 shows a flowchart of a dynamic action detection method according to embodiments of the present disclosure.

FIG. 7 shows a flowchart of a dynamic action detection method according to embodiments of the present disclosure. The dynamic action includes: at least one static action and an action trajectory of the static action; and as shown in FIG. 7, step S20 in the dynamic action detection method includes: step S21: the dynamic action in the partially updated image frame in the first queue is obtained according to the static action of each partially updated image frame in the first queue and the action trajectory of the static action in each image frame.

In a possible implementation, the dynamic action includes the static action and the static action trajectory. The static action in each partially updated image frame in the first queue is detected; and under the condition that the static action in each image frame matches, the action trajectory of the static action in each image frame is calculated; under the condition that the action trajectory of the static action in each image frame matches, the dynamic action in the partially updated image frame in the first queue is obtained according to the static action and the action trajectory of the static action. In the embodiments, the dynamic action in the partially updated image frame in the first queue is obtained according to the static action of each partially updated image frame in the first queue and the action trajectory of the static action in each image frame. The dynamic action is detected according to the static action and the action trajectory of the static action, so as to improve the detection accuracy of the dynamic action.

Figure 8:
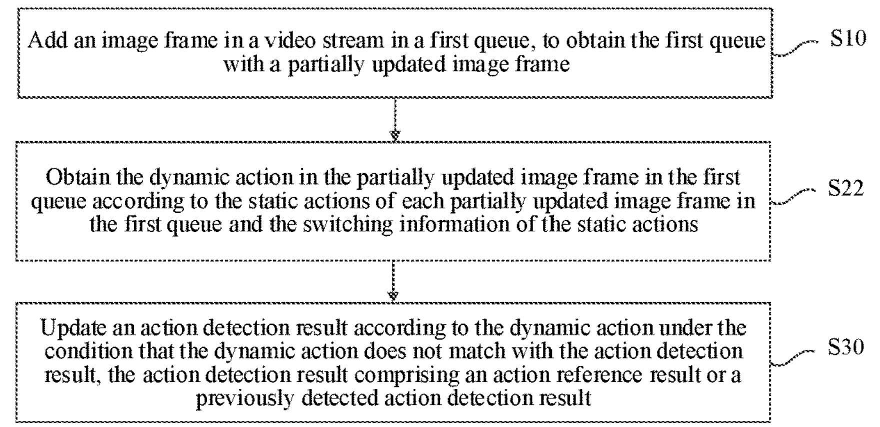
FIG. 8 shows a flowchart of a dynamic action detection method according to embodiments of the present disclosure.

FIG. 8 shows a flowchart of a dynamic action detection method according to embodiments of the present disclosure. The dynamic action includes: at least two static actions and switching information between the static actions; and as shown in FIG. 8, step S20 in the dynamic action detection method includes: step S22: the dynamic action in the partially updated image frame in the first queue is obtained according to the static actions of each partially updated image frame in the first queue and the switching information between the static actions.

In a possible implementation, the dynamic action includes the static action and the switching information of the static action. The static action in each partially updated image frame in the first queue is detected; and under the condition that the static action in each image frame matches, the switching information of the static action in each image frame is calculated; under the condition that the switching information of the static action in each image frame matches, the dynamic action in the partially updated image frame in the first queue is obtained according to the static action and the switching information of the static action. In the embodiments, the dynamic action in the partially updated image frame in the first queue is obtained according to the static action of each partially updated image frame in the first queue and the switching information of the static action in each image frame. The dynamic action is detected according to the static action and the switching information of the static action, so as to improve the detection accuracy of the dynamic action.

Figure 9:
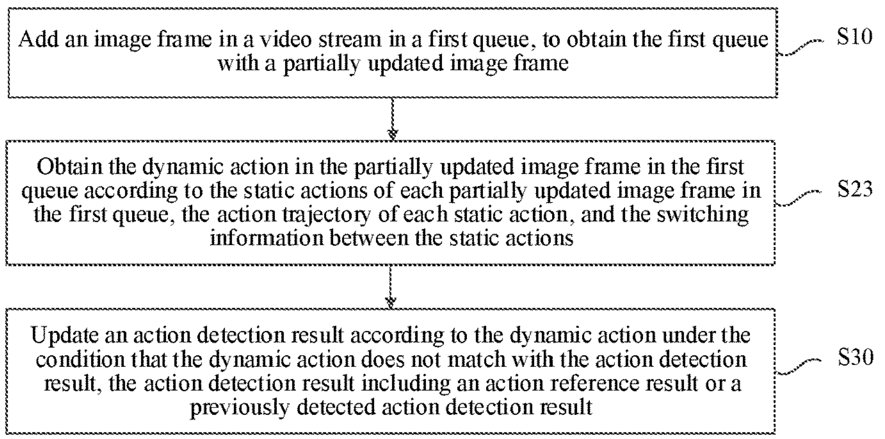
FIG. 9 shows a flowchart of a dynamic action detection method according to embodiments of the present disclosure.

FIG. 9 shows a flowchart of a dynamic action detection method according to embodiments of the present disclosure. The dynamic action includes: at least two static actions, an action trajectory of each static action, and switching information between the static actions; and as shown in FIG. 9, step S20 in the dynamic action detection method includes: step S23: the dynamic action in the partially updated image frame in the first queue is obtained according to the static actions of each partially updated image frame in the first queue, the action trajectory of each static action, and the switching information between the static actions.

In a possible implementation, the dynamic action includes the static action, the action trajectory of each static action, and the switching information of the static action. The static action in each partially updated image frame in the first queue is detected; and under the condition that the static action in each image frame matches, the action trajectory of each static action in each image frame and the switching information between the static actions are calculated; under the condition that the action trajectory of each static action in each image frame and the switching information between the static actions match, the dynamic action in the partially updated image frame in the first queue is obtained according to the static action, the action trajectory of each static action, and the switching information of the static actions. In the embodiments, the dynamic action in the partially updated image frame in the first queue is obtained according to the static actions of each partially updated image frame in the first queue, the action trajectory of each static action, and the switching information between the static actions. The dynamic action is detected according to the static action, the action trajectory of each static action, and the switching information between the static actions, so as to improve the detection accuracy of the dynamic action.

Figure 10:
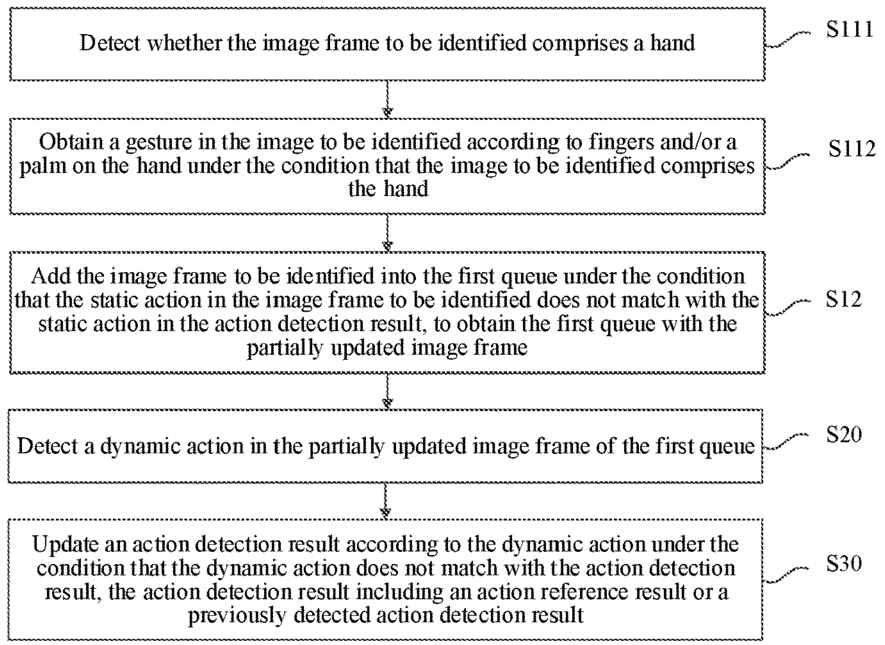
FIG. 10 shows a flowchart of a dynamic action detection method according to embodiments of the present disclosure.

FIG. 10 shows a flowchart of a dynamic action detection method according to embodiments of the present disclosure. The dynamic action includes a hand dynamic action; and the static action includes a gesture; as shown in FIG. 10, step S11 in the dynamic action detection method includes: step S111: whether the image frame to be identified includes a hand is detected; and step S112: a gesture in the image to be identified is obtained according to fingers and/or a palm on the hand under the condition that the image to be identified includes the hand.

In a possible implementation, the dynamic action includes various types of dynamic actions such as a hand dynamic action, a limb dynamic action, etc. The executor of the hand dynamic action includes humans, animals, robots, etc. The hand dynamic action includes a dynamic action of a hand of a human or a dynamic action of a hand of a robot. No limitation is made thereto in the present disclosure. Whether the image frame to be identified includes a hand is first detected. The image frame to be identified can be input into the neural network, and an operation such as convolution processing is performed on the image frame to be identified by means of the neural network, to detect whether the image frame to be identified includes a hand. When the detection result is not including a hand, subsequent analysis is not performed on the image frame to be identified to save system resources.

In a possible implementation, when the detection result is that the image frame to be identified includes a hand, a gesture is further determined. The gesture is obtained according to fingers on the hand. For example, the gesture is determined to be “five” when five fingers are extending. The gesture is also obtained according to the palm of the hand, for example, the gesture is “upwards” or “downwards” according to whether a palm center faces upwards or downwards. The gesture is further obtained according to the fingers and the palm on the hand. For example, the gesture is determined as “pressing downwards” when the five fingers are extending and the palm center faces downwards. The gesture is obtained according to the fingers and/or palm according to requirements. No limitation is made thereto in the present disclosure. In the embodiments, whether the image frame to be identified includes a hand is detected; under the condition that the image to be identified includes a hand, the gesture in the image to be identified is obtained according to the fingers and/or palm on the hand. Detecting whether the image frame to be identified includes a hand can improve the detection efficiency of the dynamic action.

In a possible implementation, step S112 includes: identifying the gesture in the image to be identified according to a position of a first key point of the fingers on the hand and/or a position of a second key point of the palm; the first key point of the fingers includes a fingertip or a knuckle; the second key point of the palm includes a point on a palm center, a palm back, or a palm edge.

In a possible implementation, in a conventional gesture identification method, when using a gesture template for gesture identification, gestures need to be input into the template in advance, rendering low efficiency in gesture identification and high dependency on the template. In a possible implementation, a first key point is determined on the finger. One or more first key points are determined on one finger. For example, the points of knuckle and fingertip positions are determined as the first key points. A second key point is determined on the palm. The palm includes one or more key points. For example, a point on a palm center, a palm back, or a palm edge is determined as the second key point. In the embodiments of the present disclosure, different gestures can be flexibly and accurately identified according to the positions of the key points of the hand, which avoids dependency on the gesture identification template.

In a possible implementation, the gesture is determined according to the position of the first key point of the finger and the gesture is also determined according to the position of the second key point of the palm; furthermore, the position of the first key point of the finger and the position of the second key point of the palm are combined for follow-up gesture determination. In the embodiments, the gesture in the image frame to be identified is determined according to the position of the first key point of the finger and/or the position of the second key point of the palm. The gesture determined according to the key points of the hand is accurate and reliable.

In a possible implementation, the hand dynamic action further includes an action trajectory and/or switching information of the gesture; and step S13 in the dynamic action detection method includes: determining the action trajectory and/or the switching information in the image frame to be identified according to the first key point in the image frame to be identified and a first key point in the image frame in the second queue corresponding thereto; and/or determining the action trajectory and/or the switching information in the image frame to be identified according to the second key point in the image frame to be identified and a second key point in the image frame in the second queue corresponding thereto.

In a possible implementation, under the condition that the gesture is determined according to the fingers, according to the first key point in the image frame to be identified and the position difference between that and the first key point of the image frame in the second queue corresponding thereto, the action trajectory and/or switching information in the image frame to be identified are determined.

In a possible implementation, under the condition that the gesture is determined according to the palm, according to the second key point in the image frame to be identified and the position difference between that and the second key point of the image frame in the second queue corresponding thereto, the action trajectory and/or switching information in the image frame to be identified are determined.

In a possible implementation, under the condition that the gesture is determined according to the fingers and the palm, according to the first key point in the image frame to be identified and the position difference between that and the first key point of the image frame in the second queue corresponding thereto, and according to the second key point in the image frame to be identified and the position difference between that and the second key point of the image frame in the second queue corresponding thereto, the action trajectory and/or switching information in the image frame to be identified are determined together. In the embodiments, according to the first key point in the image frame to be identified and the first key point of the image frame in the second queue corresponding thereto, and/or according to the second key point in the image frame to be identified and the second key point of the image frame in the second queue corresponding thereto, the action trajectory and/or switching information in the image frame to be identified are determined. According to the first key point and/or the second key point, the accurate action trajectory and/or switching information in the image frame to be identified are obtained so that the detection result of the dynamic action is accurate and reliable.

In a possible implementation, the dynamic action includes: a static action and an action trajectory of the static action; step S20 includes: detecting the static action in the image frame in the first queue; calculating an accumulated movement distance of a static action in a target image frame in an X axial direction and a Y axial direction with respect to the static action in a first image frame in the first queue; the target image frame including any image frame in the first queue except the first image frame; and obtaining the dynamic action in the image frame in the first queue according to the static action in the target image frame and the accumulated movement distance.

In a possible implementation, an image coordinate system is established for the image frame; a coordinate position of the static action in each image frame in the image coordinate system is determined to obtain coordinate values of the static action in an X axis and a Y axis. For example, when the static action is a gesture, the coordinate values of the gesture on the X axis and Y axis are obtained according to the coordinate values of the first key point of the hand on the X axis and the Y axis and/or according to the coordinate values of the second key point of the hand on the X axis and the Y axis. In a possible implementation, an accumulated movement distance of the static action in each image frame in the X axial direction and the Y axial direction with respect to the static action in the first image frame in the first queue is calculated. The accumulated movement distance includes an array consisting of an accumulated movement distance of the X axis and an accumulated movement distance of the Y axis. According to the accumulated movement distance, the moving direction and moved distance of the static action in each image frame with respect to the static action in the first image frame are determined. In the embodiments, the dynamic action in the first queue is determined according to the static action in each image frame in the first queue and the accumulated movement distance of the static action. The accumulated movement distance of the static action in each image frame is determined according to the position change of each image frame in the image coordinate system. According to the image coordinate system, the accumulated movement distance of the static action in each image frame is accurately obtained. Therefore, the result of the action identification is accurate and reliable and an error rate of action identification is reduced.

In a possible implementation, the obtaining the dynamic action in the image frame in the first queue according to the static action in the target image frame and the accumulated movement distance includes: determining the dynamic action of the target object in the image frame in the first queue to be a discontinuous action under the condition that the accumulated movement distance of the static action in the target image frame is less than a movement threshold.

In a possible implementation, the dynamic action has continuity; when the movement of the static action on the spatial position reaches a certain distance, it is determined that a dynamic action is generated. When the movement distance of the static action on the spatial position is too small, it is considered that the executor stops execution of the dynamic action. A movement threshold is determined according to requirements; under the condition that the accumulated movement distance of the static action in the image frame is smaller than the movement threshold, it is considered that a discontinuity of the dynamic action in the image frame is generated. In the embodiments, the movement threshold is used for accurately determining whether the action in the image frame of the first queue is a discontinuous action, so that the action identification result is accurate and reliable.

In a possible implementation, the obtaining the dynamic action in the image frame in the first queue according to the static action in the target image frame and the accumulated movement distance includes: calculating a ratio of the accumulated movement distance of the static action in each image frame with respect to the width of the target object to which the static action belongs under the condition that the accumulated movement distance is greater than or equal to the movement threshold; determining the action trajectory of the static action in the target image frame as a rotational action trajectory under the condition that the ratio is less than a ratio threshold; and obtaining the dynamic action in the image frame in the first queue according to the static action and the rotational action trajectory in the target image frame.

In a possible implementation, the dynamic action includes a rotational action. For example, the hand dynamic action is used as an example. When the dynamic action is a hand dynamic action, a ratio of the accumulated movement distance of the gesture in each image frame with respect to the width of the hand is calculated. The accumulated movement distance of the gesture is represented in the image coordinate system using a vector. The ratio of the size of the vector and the width of the hand is calculated. Under the condition that the ratio is less than the ratio threshold, it is considered that the action trajectory of the gesture in each image frame is a rotational action trajectory.

In this embodiment, a ratio of the accumulated movement distance of the static action in each image frame with respect to the width of the target object to which the static action belongs is calculated; the action trajectory of the static action in the target image frame is determined as a rotational action trajectory under the condition that the ratio is less than a ratio threshold. According to the accumulated movement distance and the ratio threshold, the dynamic action detection result can be more accurate.

In a possible implementation, the method further includes: determining the action trajectory of the static action in the target image frame as a translation action trajectory under the condition that the ratio is greater than or equal to the ratio threshold; and obtaining the dynamic action in the image frame in the first queue according to the static action and the translation action trajectory in the target image frame.

In a possible implementation, the action trajectory of the static action includes the translation action trajectory. Under the condition that the ratio is greater than or equal to the ratio threshold, it is considered that the action trajectory of the gesture in each image frame is a translation action trajectory. In this embodiment, according to the accumulated movement distance and the ratio threshold, it is determined that the action trajectory of the static action is a translation action trajectory, so that the dynamic action detection result can be more accurate.

Figure 11:
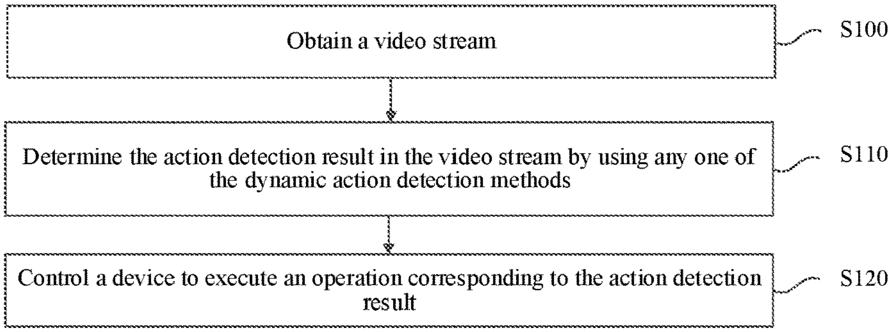
FIG. 11 shows a flowchart of a dynamic action control method according to embodiments of the present disclosure.

FIG. 11 shows a flowchart of a dynamic action control method according to embodiments of the present disclosure. The dynamic action control method can be executed by electronic devices such as terminal devices or servers, where the terminal devices may be a User Equipment (UE), a mobile device, a user terminal, a terminal, a cellular phone, a cordless phone, a Personal Digital Assistant (PDA), a handheld device, a computing device, a vehicle-mounted device, a wearable device, etc. In some possible implementations, the dynamic action control method may be implemented by means of invoking, by the processor, the computer readable instruction stored in the memory.

As shown in FIG. 11, the dynamic action control method includes: step S100, a video stream is obtained. Step S110: the action detection result in the video stream is determined by using any one of the dynamic action detection method. Step S120: a device is controlled to execute an operation corresponding to the action detection result.

In a possible implementation, a photographing apparatus may be provided on a device that needs a control operation, and a video stream may be acquired in real time by the photographing apparatus. It is also possible to obtain a video stream that has been captured by the photographing apparatus. Video streams may be captured by different photographing apparatuses. The photographing apparatus may include a binocular camera, a depth camera, or a normal camera. Different types of cameras may be used for capturing video streams according to the needs of dynamic action detection.

In a possible implementation, step S120 includes: obtaining an operation instruction corresponding to the action detection result according to a predetermined correspondence between the action detection result and the operation instruction; and controlling the device to execute a corresponding operation according to the operation instruction.

In a possible implementation, the correspondence between the action detection result and the operation instruction may be preset. In the correspondence, one action detection result may correspond to one operation instruction, or multiple action detection results may correspond to one operation instruction. The type and content of the operation instruction may be determined according to the type of the device to be operated and operation requirements. The present disclosure does not limit the form and specific content of the operation instruction.

In a possible implementation, the operation instruction may be output to control the device to be operated. Since the action in the video stream may be tracked in real time by the action detection result, the action of the execution object in the video stream may also be tracked in real time by the output operation instruction, so that the operator can control the operated device accurately.

In this embodiment, the operation instruction corresponding to the action detection result may be determined according to the correspondence and the action detection result and then output. Based on the real-time and accuracy of the action detection result, the action of the execution object in the video stream may also be tracked in real time by the operation instruction, so that the operator can operate the device more accurately.

In a possible implementation, the controlling the device to execute a corresponding operation according to the operation instruction includes: controlling a window, a door, a vehicle-mounted system, or a vehicle-mounted device of a vehicle according to the operation instruction.

In a possible implementation, a monitoring device may be provided in the vehicle to take a surveillance video of the driver or a passenger in the vehicle as a video stream. Dynamic action detection may be performed in real time on the taken video stream. According to the predetermined correspondence between the action detection result and the operation instruction, the operation instruction corresponding to the action detection result is obtained; then the window, the door, the vehicle-mounted system, or the vehicle-mounted device (such as a vehicle-mounted multimedia device and a vehicle-mounted robot) of the vehicle is controlled according to the operation instruction.

In a possible implementation, the controlling a device to execute an operation corresponding to the action detection result includes:

in response to the detection result being a predefined dynamic action, controlling a vehicle to execute an operation corresponding to the predefined dynamic action.

In a possible implementation, the predefined dynamic action includes a dynamic gesture which includes at least one of the following: single-finger clockwise/counterclockwise rotation, palm left/right swing, two-finger poke, extending the thumb and pinky finger, press-down with the palm downward, left/right movement with the thumb extended, long slide to the left/right with the palm, changing a fist into a palm with the palm upward, changing a palm into a fist with the palm upward, changing a palm into a fist with the palm downward, changing a fist into a palm with the palm downward, single-finger slide, pinch-in with multiple fingers, single-finger double click, single-finger single click, multi-finger double click, and multi-finger single click; and the operation corresponding to the predefined dynamic action includes at least one of the following: volume up/down, song switching, song pause/resume, call answering or initiation, hang-up or call rejection, air conditioning temperature increase or decrease, multi-screen interaction, sunroof opening, sunroof closing, door lock locking, door lock unlocking, drag for navigation, map zoom-out, and map zoom-in.

In a possible implementation, the dynamic gesture of single-finger clockwise/counterclockwise rotation may be used for adjusting the volume of an audio device in the vehicle up/down. The dynamic gesture of palm left/right swing may be used for song switching on the audio device in the vehicle. The dynamic gesture of two-finger poke may be used for song pause/resume on the audio device in the vehicle. The dynamic gesture of extending the thumb and pinky finger may be used for call answering or initiation on a communication device in the vehicle. The dynamic gesture of press-down with the palm downward may be used for hang-up or call rejection on the communication device in the vehicle. The dynamic gesture of left/right movement with the thumb extended may be used for increasing or decreasing the air conditioning temperature of the air conditioning device in the vehicle. The dynamic gesture of long slide to the left/right with the palm may be used for performing a multi-screen interaction operation on the display screen in the vehicle. The dynamic gesture of changing a fist into a palm with the palm upward may be used for opening the sunroof of the vehicle (such as opening the sunroof by a set length each time, for example, opening the sunroof by 10 centimeters each time). The dynamic gesture of changing a palm into a fist with the palm upward may be used for closing the sunroof of the vehicle. The dynamic gesture of changing a palm into a fist with the palm downward may be used for locking the door lock of the vehicle. The dynamic gesture of changing a fist into a palm with the palm downward may be used for unlocking the door lock of the vehicle. The dynamic gesture of single-finger slide may be used for performing a drag for navigation operation on the navigation device of the vehicle. The dynamic gesture of pinch-in with multiple fingers may be used for zooming out the map on the navigation device of the vehicle. The dynamic gesture of single-finger double click may be used for zooming in the map on the navigation device of the vehicle. In this embodiment, a window, a door, or a vehicle-mounted system of the vehicle may be controlled by using the operation instruction. Different operations may be performed on the vehicle itself or on a vehicle-mounted system of the vehicle by means of dynamic actions recognized from the video stream. Based on the dynamic action detection methods in the embodiments of the present disclosure, the operator can control the vehicle itself or the vehicle-mounted system accurately.

Figure 12:
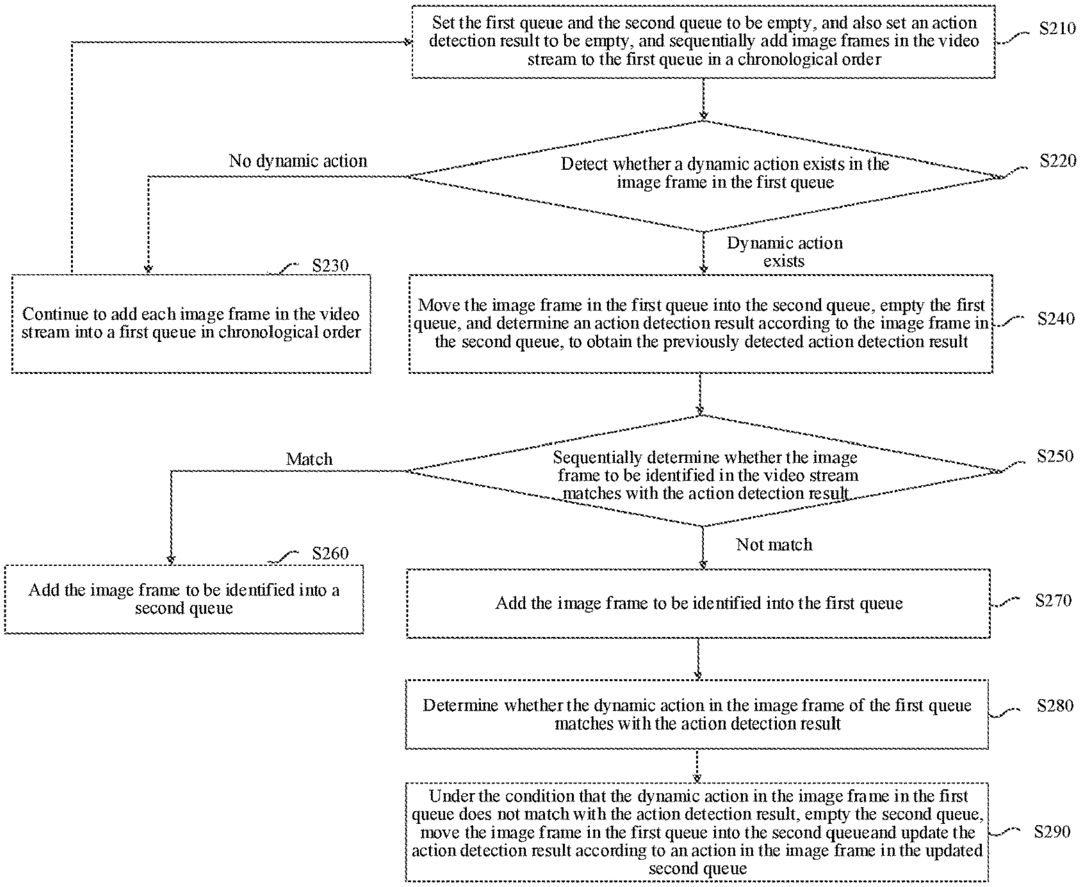
FIG. 12 shows a flowchart of an action recognition method according to embodiments of the present disclosure.

Application example: FIG. 12 shows a flowchart of an action recognition method according to embodiments of the present disclosure. As shown in FIG. 12:

a depth camera may be provided in the vehicle, and the driver's surveillance image is acquired by the depth camera as a video stream. Real-time action recognition may be performed on the captured surveillance image. In this embodiment, action recognition is performed on the driver's hand action.

I. The previously detected action detection result is obtained: step S210, the first queue and the second queue are set as empty, and the action detection result is also set as empty. Image frames in the video stream are sequentially added to the first queue in chronological order. Step S220, whether there is a dynamic action in the image frames in the first queue is detected. If there is no dynamic action, the process proceeds to step S230, and if there is a dynamic action, the process proceeds to step S240.

In a possible implementation, the length of the first queue may be ten image frames. After the first to tenth image frames in the video stream are added to the first queue, whether there is a dynamic action in the ten image frames in the first queue may be determined. For example, the dynamic action is a hand dynamic action. Specifically, whether there is a hand in the image frames may be recognized in sequence, and if there is a hand in the image frames in the first queue, a gesture in the image to be recognized may be recognized according to the finger and/or the palm of the hand. If a gesture in each image frame is matched, action trajectory and/or switching information of the gesture in the each image frame may be determined. If the action trajectory and/or switching information of the gesture in the at least one image frame is also matched, a dynamic action in the first queue may be detected.

Step S230, each image frame of the video stream continues to be added to the first queue in chronological order, and the process jumps to step S220. In a possible implementation, the eleventh image frame may be added to the rear end of the first queue, and the first image frame on the front end of the first queue is removed from the first queue. At this time, the first queue includes the second to eleventh image frames, and whether there is an action in the first queue may be determined after the process jumps to step S220. If there is no action, the twelfth image frame may continue to be added to the first queue, and the second image frame is removed, until it is determined according to step S220 that there is an action in the image frames in the first queue.

Step S240, the image frames in the first queue is moved to the second queue. The first queue is emptied, and an action detection result is determined according to the image frames in the second queue, and thus, the previously detected action detection result is obtained. In a possible implementation, after the previously detected action detection result is obtained, the first queue is empty, and the second queue includes ten image frames, which are the twenty-third to thirty-second image frames in the video stream. An action detection result may be determined according to an action in the image frames in the second queue. Image frames on which no action recognition is performed in the video stream may be used as image frames to be recognized for subsequent analysis. That is, the image frames starting from the thirty-third image frame may be used as image frames to be recognized, and subjected to step S250 of subsequent dynamic action detection.

II. The dynamic action detection step: step S250: whether each image frame to be identified in the video stream matches with the action detection result in sequence is determined. If yes, the process proceeds to step S260, and if not, the process proceeds to step S270.

In a possible implementation, whether the thirty-third image frame is matched with the action detection result may be determined according to the thirty-third image frame and the rearmost image frame in the second queue (the thirty-second image frame). Whether a gesture in the thirty-third image frame is consistent with the gesture in the thirty-second image frame in the second queue may be first determined. Under the condition that the gesture is consistent, whether the action trajectory and/or switching information of the gesture in a 33-th image frame match with the action trajectory and/or switching information of the gesture in the action detection result is determined. If the action trajectory and/or switching information of the gesture is also matched, it may be determined that the thirty-third image frame is matched with the action detection result.

Step S260, if yes, the image frame to be recognized is added to the second queue. In a possible implementation, after the thirty-third image frame is added to the second queue, the image frames in the second queue are updated to the twenty-fourth to thirty-third frames.

Step S270, if yes, the image frame to be recognized is added to the first queue.

Step S280, whether the dynamic action in the image frame of the first queue matches with the action detection result is determined. If not, the process proceeds to step S290.

Step S290, if the dynamic action in the image frame in the first queue is not matched with the action detection result, the second queue is emptied, and the image frame in the first queue is moved to the second queue. Moreover, the action detection result is updated according to an action in the image frame in the updated second queue.

It can be understood that the foregoing various method embodiments mentioned in the present disclosure may be combined with each other to form a combined embodiment without departing from the principle logic. Details are not described herein again due to space limitation. A person skilled in the art can understand that, in the foregoing methods of the specific implementations, the order in which the steps are written does not imply a strict execution order which constitutes any limitation to the implementation process, and the specific order of executing the steps should be determined by functions and possible internal logics thereof.

In addition, the present disclosure further provides a dynamic action detection apparatus, a dynamic action control apparatus, an electronic device, a computer readable storage medium, and a program, which can all be configured to implement any one of the dynamic action detection methods and the dynamic action control methods provided in the present disclosure. For the corresponding technical solutions and descriptions, please refer to the corresponding contents in the method parts. Details are not described herein again.

Figure 13:
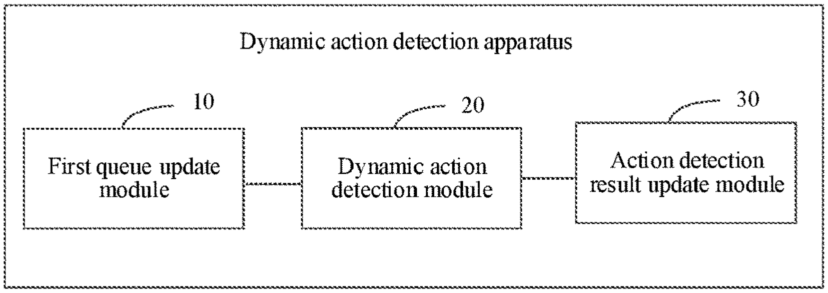
FIG. 13 shows a block diagram of a dynamic action detection apparatus according to embodiments of the present disclosure.

FIG. 13 shows a block diagram of a dynamic action detection apparatus according to embodiments of the present disclosure. As shown in FIG. 13, the dynamic action detection apparatus includes: a first queue update module 10, configured to add an image frame in a video stream into a first queue, to obtain the first queue with a partially updated image frame; a dynamic action detection module 20, configured to detect a dynamic action in the partially updated image frame in the first queue; and an action detection result update module 30, configured to update an action detection result according to the dynamic action under the condition that the dynamic action does not match with the action detection result, the action detection result including an action reference result or a previously detected action detection result.

In a possible implementation, the apparatus further includes: a previously detected action detection result obtaining module, configured to move the image frame in the first queue into a second queue under the condition that a dynamic action exists in the image frame of the first queue; and determine the action detection result according to an image frame in the second queue.

In a possible implementation, the action detection result includes a static action; the first queue update module 10 includes: a first obtaining sub-module, configured to obtain a static action in an image frame to be identified in the video stream; and a first update sub-module, configured to add the image frame to be identified into the first queue under the condition that the static action in the image frame to be identified does not match with the static action in the action detection result, to obtain the first queue with the partially updated image frame.

In a possible implementation, the action detection result further includes an action trajectory and/or switching information of the static action; and the first queue update module 10 includes: a second obtaining sub-module, configured to determine the action trajectory and/or switching information of the static action in the image frame to be identified according to the image frame to be identified and the image frame in the second queue under the condition that the static action in the image frame to be identified does not match with the static action in the action detection result; and a second update sub-module, configured to add the image frame to be identified into the first queue under the condition that the action trajectory and/or switching information of the static action in the image frame to be identified does not match with the action detection result, to obtain the first queue with the partially updated image frame.

In a possible implementation, the apparatus further includes: a queue transfer module, configured to empty the second queue and move the image frame in the first queue into the second queue under the condition that the dynamic action detected according to the partially updated image frame in the first queue does not match with the action detection result; and an action detection result update module, configured to update the action detection result according to a dynamic action in the image frame in the second queue.

In a possible implementation, the video stream obtained by means of photographing is subjected to real-time dynamic action detection and control of the electronic device is executed according to the dynamic action obtained by means of real-time detection. The static action in the image frame to be identified in the video stream and the action trajectory and/or switching information of the static action are detected for whether they match with the action detection result; if not, the image frame to be identified is added into the first queue to partially update the first queue. When the new dynamic action appears in the partially updated image frame in the first queue is detected, the second queue is emptied; all the image frames in the first queue are moved into the second queue, and according to the dynamic action in the image frame in the updated second queue, the action detection result is updated. Real-time analysis is performed on each image frame in the video steam to improve the instantaneity and accuracy of the dynamic action detection.

In a possible implementation, the apparatus further includes: a second queue update module, configured to add the image frame to be identified into the second queue under the condition that a static action in the image frame to be identified, and the action trajectory and/or switching information of the static action match with the action detection result.

In a possible implementation, the dynamic action includes: at least one static action and an action trajectory of the static action; and the dynamic action detection module 20 includes: a first dynamic action detection sub-module, configured to obtain the dynamic action in the partially updated image frame in the first queue according to the static action of each partially updated image frame in the first queue and the action trajectory of the static action in each image frame.

In a possible implementation, the dynamic action includes: at least two static actions and switching information between the static actions; and the dynamic action detection module 20 includes: a second dynamic action detection sub-module, configured to obtain the dynamic action in the partially updated image frame in the first queue according to the static actions of each partially updated image frame in the first queue and the switching information of the static actions.

In a possible implementation, the dynamic action includes: at least two static actions, an action trajectory of each static action, and switching information between the static actions; and the dynamic action detection module 20 includes: a third dynamic action detection sub-module, configured to obtain the dynamic action in the partially updated image frame in the first queue according to the static actions of each partially updated image frame in the first queue, the action trajectory of each static action, and the switching information between the static actions. In a possible implementation, the dynamic action includes a hand dynamic action; the static action includes a gesture; and the first obtaining sub-module includes: a hand detection unit, configured to detect whether the image frame to be identified includes a hand; and a gesture determining unit, configured to obtain a gesture in the image to be identified according to fingers and/or a palm on the hand under the condition that the image to be identified includes the hand.

In a possible implementation, the gesture determining unit is configured to: identify the gesture in the image to be identified according to a position of a first key point of the fingers on the hand and/or a position of a second key point of the palm; the first key point of the fingers includes a fingertip or a knuckle; the second key point of the palm includes a point on a palm center, a palm back, or a palm edge.

In a possible implementation, the hand dynamic action further includes an action trajectory and/or switching information of the gesture; and the second obtaining sub-module includes:

a first obtaining unit, configured to determine the action trajectory and/or the switching information in the image frame to be identified according to the first key point in the image frame to be identified and the first key point in the image frame in the second queue corresponding thereto; and/or a second obtaining unit, configured to determine the action trajectory and/or the switching information in the image frame to be identified according to the second key point in the image frame to be identified and the second key point in the image frame in the second queue corresponding thereto.

In a possible implementation, the dynamic action includes: a static action and an action trajectory of the static action; and the dynamic action detection module 20 includes: a static action detection sub-module, configured to detect the static action in the image frame in the first queue; an accumulated movement distance determining sub-module, configured to calculate an accumulated movement distance of a static action in a target image frame in an X axial direction and a Y axial direction with respect to the static action in a first image frame in the first queue; the target image frame including any image frame in the first queue except the first image frame; and a fourth dynamic action detection sub-module, configured to obtain the dynamic action in the image frame in the first queue according to the static action in the target image frame and the accumulated movement distance.

In a possible implementation, the fourth dynamic action detection sub-module is configured to: determine the dynamic action of the target object in the image frame in the first queue to be a discontinuous action under the condition that the accumulated movement distance of the static action in the target image frame is less than a movement threshold.

In a possible implementation, the fourth dynamic action detection sub-module is configured to: calculate a ratio of the accumulated movement distance of the static action in each image frame with respect to the width of the target object to which the static action belongs under the condition that the accumulated movement distance is greater than or equal to the movement threshold; determine the action trajectory of the static action in the target image frame as a rotational action trajectory under the condition that the ratio is less than a ratio threshold; and obtain the dynamic action in the image frame in the first queue according to the static action and the rotational action trajectory in the target image frame.

In a possible implementation, the fourth dynamic action detection sub-module is further configured to: determine the action trajectory of the static action in the target image frame as a translation action trajectory under the condition that the ratio is greater than or equal to the ratio threshold; and obtain the dynamic action in the image frame in the first queue according to the static action and the translation action trajectory in the target image frame.

Figure 14:
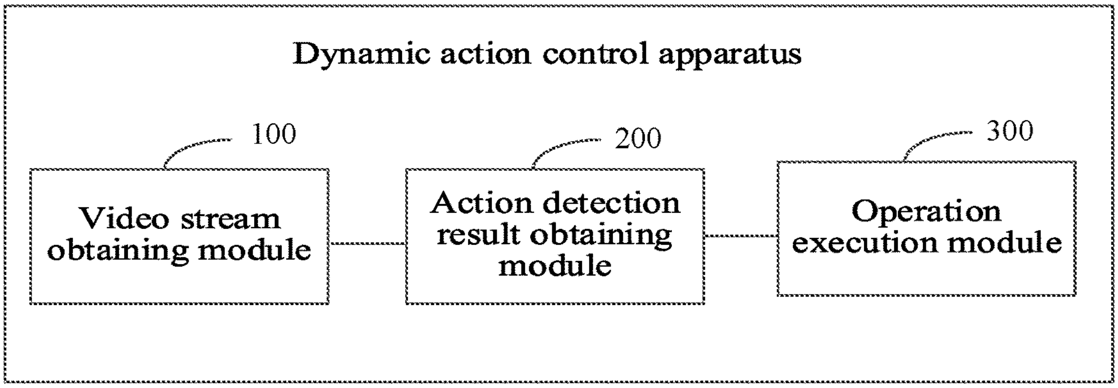
FIG. 14 shows a block diagram of a dynamic action control apparatus according to embodiments of the present disclosure.

FIG. 14 shows a block diagram of a dynamic action control apparatus according to embodiments of the present disclosure. As shown in FIG. 14, the dynamic action control apparatus includes: a video stream obtaining module 100, configured to obtain a video stream; an action detection result obtaining module 200, configured to determine an action detection result in the video stream by using the dynamic action detection apparatus; and an operation execution module 300, configured to control a device to execute an operation corresponding to the action detection result.

In a possible implementation, a photographing apparatus may be provided on a device that needs a control operation, and a video stream may be acquired in real time by the photographing apparatus. It is also possible to obtain a video stream that has been captured by the photographing apparatus. Video streams may be captured by different photographing apparatuses. The photographing apparatus may include a binocular camera, a depth camera, or a normal camera. Different types of cameras may be used for capturing video streams according to the needs of dynamic action detection.

In a possible implementation, the operation execution module 300 includes: an operation instruction obtaining sub-module, configured to obtain an operation instruction corresponding to the action detection result according to a predetermined correspondence between the action detection result and the operation instruction; and an operation execution sub-module, configured to control the device to execute a corresponding operation according to the operation instruction.

In a possible implementation, the operation execution sub-module is configured to: control a window, a door, a vehicle-mounted system, or a vehicle-mounted device of a vehicle according to the operation instruction.

In a possible implementation, a monitoring device may be provided in the vehicle to take a surveillance video of the driver or a passenger in the vehicle as a video stream. Dynamic action detection may be performed in real time on the taken video stream. According to the predetermined correspondence between the action detection result and the operation instruction, the operation instruction corresponding to the action detection result is obtained; then the window, the door, the vehicle-mounted system, or the vehicle-mounted device (such as a vehicle-mounted multimedia device and a vehicle-mounted robot) of the vehicle is controlled according to the operation instruction.

In a possible implementation, the operation execution module 300 is further configured to: in response to the detection result being a predefined dynamic action, control a vehicle to execute an operation corresponding to the predefined dynamic action.

In a possible implementation, the predefined dynamic action includes a dynamic gesture which includes at least one of the following: single-finger clockwise/counterclockwise rotation, palm left/right swing, two-finger poke, extending the thumb and pinky finger, press-down with the palm downward, left/right movement with the thumb extended, long slide to the left/right with the palm, changing a fist into a palm with the palm upward, changing a palm into a fist with the palm upward, changing a palm into a fist with the palm downward, changing a fist into a palm with the palm downward, single-finger slide, pinch-in with multiple fingers, single-finger double click, single-finger single click, multi-finger double click, and multi-finger single click; and the operation corresponding to the predefined dynamic action includes at least one of the following: volume up/down, song switching, song pause/resume, call answering or initiation, hang-up or call rejection, air conditioning temperature increase or decrease, multi-screen interaction, sunroof opening, sunroof closing, door lock locking, door lock unlocking, drag for navigation, map zoom-out, and map zoom-in.

In some embodiments, the functions provided by or the modules included in the apparatuses provided by the embodiments of the present disclosure may be used to implement the methods described in the foregoing method embodiments. For specific implementations, reference may be made to the description in the method embodiments above. For the technical effect of the apparatus, reference may be made to the recitation of corresponding method embodiments. For the purpose of brevity, details are not described herein again.

The embodiments of the present disclosure further provide a computer-readable storage medium, having computer program instructions stored thereon, where when the computer program instructions are executed by a processor, the foregoing methods are implemented. The computer-readable storage medium may be a nonvolatile computer-readable storage medium or a volatile computer-readable storage medium.

The embodiments of the present disclosure further provide an electronic device, including: a processor; and a memory configured to store processor-executable instructions, where the processor is configured to execute any one of the foregoing methods. The electronic device may be provided as a terminal, a server, or devices in other forms.

The embodiments of the present disclosure further provide a computer program, including a computer readable code, where when the computer readable code runs in the electronic device, the processor in the electronic device executes any method embodiment of the present disclosure.

Figure 15:
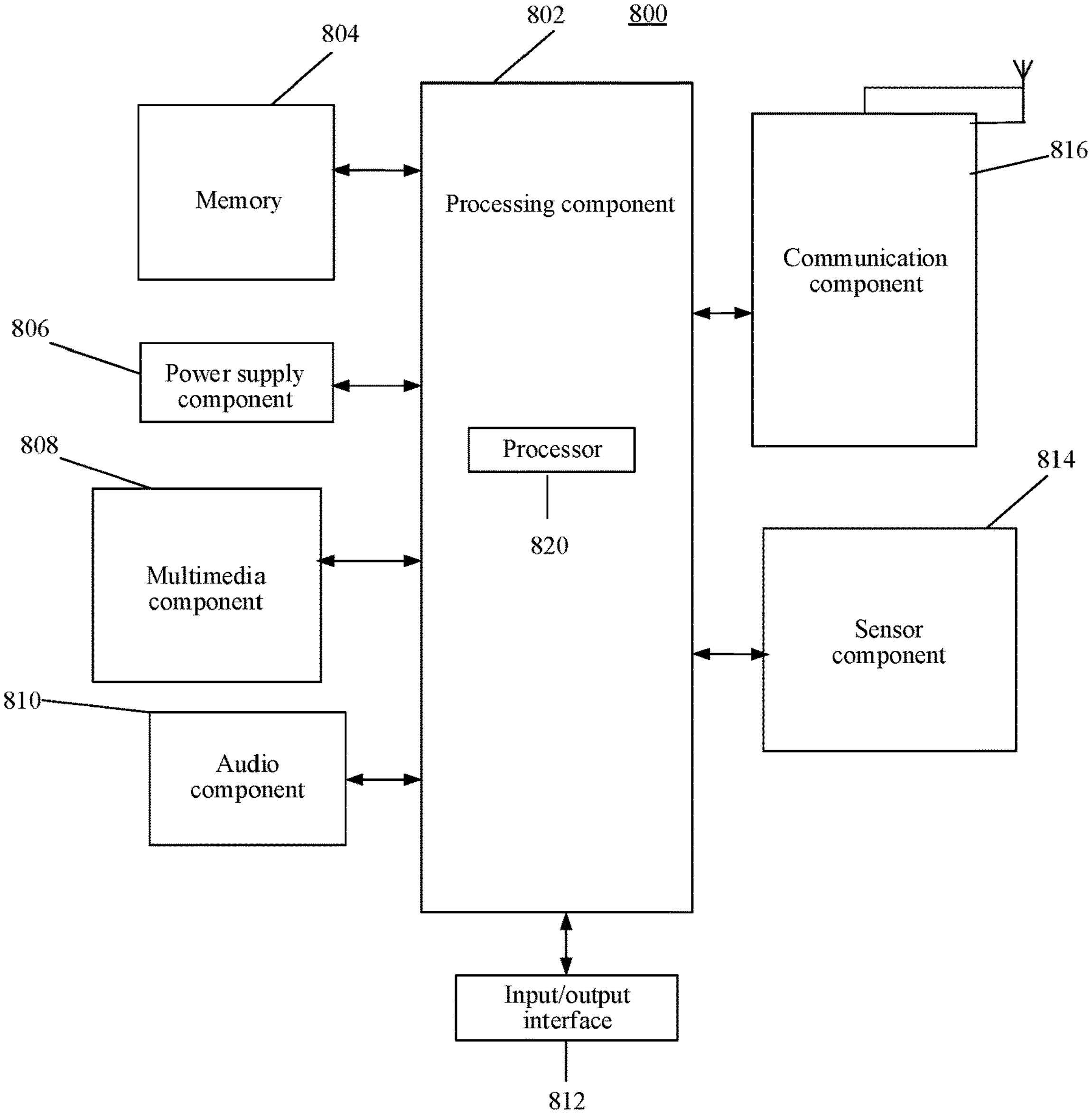
FIG. 15 is a block diagram of an electronic device according to one exemplary embodiment.

FIG. 15 is a block diagram of an electronic device 800 according to exemplary embodiment. For example, the electronic device 800 may be a terminal such as a mobile phone, a computer, a digital broadcast terminal, a message transceiver device, a game console, a tablet device, a medical device, exercise equipment, and a personal digital assistant.

Referring to FIG. 15, the electronic device 800 may include one or more of the following components: a processing component 802, a memory 804, a power component 806, a multimedia component 808, an audio component 810, an Input/Output (I/O) interface 812, a sensor component 814, and a communication component 816.

The processing component 802 generally controls overall operation of the electronic device 800, such as operations associated with display, phone calls, data communications, camera operations, and recording operations. The processing component 802 may include one or more processors 820 to execute instructions to implement all or some of the steps of the methods above. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations on the electronic device 800. Examples of the data include instructions for any application or method operated on the electronic device 800, contact data, contact list data, messages, pictures, videos, and etc. The memory 804 may be implemented by any type of volatile or non-volatile storage device, or a combination thereof, such as a Static Random-Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a disk or an optical disk.

The power component 806 provides power for various components of the electronic device 800. The power component 806 may include a power management system, one or more power supplies, and other components associated with power generation, management, and distribution for the electronic device 800.

The multimedia component 808 includes a screen between the electronic device 800 and a user that provides an output interface. In some embodiments, the screen may include a Liquid Crystal Display (LCD) and a Touch Panel (TP). If the screen includes a TP, the screen may be implemented as a touch screen to receive input signals from the user. The TP includes one or more touch sensors for sensing touches, swipes, and gestures on the TP. The touch sensor may not only sense the boundary of a touch or swipe action, but also detect the duration and pressure related to the touch or swipe operation. In some embodiments, the multimedia component 808 includes a front-facing camera and/or a rear-facing camera. When the electronic device 800 is in an operation mode, for example, a photography mode or a video mode, the front-facing camera and/or the rear-facing camera may receive external multimedia data. Each of the front-facing camera and the rear-facing camera may be a fixed optical lens system, or have focal length and optical zoom capabilities.

The audio component 810 is configured to output and/or input an audio signal. For example, the audio component 810 includes a microphone (MIC), and the microphone is configured to receive an external audio signal when the electronic device 800 is in an operation mode, such as a calling mode, a recording mode, and a voice recognition mode. The received audio signal may be further stored in the memory 804 or transmitted by means of the communication component 816. In some embodiments, the audio component 810 further includes a speaker for outputting the audio signal.

The I/O interface 812 provides an interface between the processing component 802 and a peripheral interface module, which may be a keyboard, a click wheel, a button, etc. The button may include, but is not limited to, a home button, a volume button, a start button, and a lock button.

The sensor component 814 includes one or more sensors for providing state assessment in various aspects for the electronic device 800. For example, the sensor component 814 may detect an on/off state of the electronic device 800, and relative positioning of components, which are the display and keypad of the electronic device 800, for example, and the sensor component 814 may further detect a position change of the electronic device 800 or a component of the electronic device 800, the presence or absence of contact of the user with the electronic device 800, the orientation or acceleration/deceleration of the electronic device 800, and a temperature change of the electronic device 800. The sensor component 814 may include a proximity sensor, which is configured to detect the presence of a nearby object when there is no physical contact. The sensor component 814 may further include a light sensor, such as a CMOS or CCD image sensor, for use in an imaging application. In some embodiments, the sensor component 814 may further include an acceleration sensor, a gyroscope sensor, a magnetic sensor, a pressure sensor, or a temperature sensor.

The communication component 816 is configured to facilitate wired or wireless communications between the electronic device 800 and other devices. The electronic device 800 may access a wireless network based on a communication standard, such as WiFi, 2G, or 3G, or a combination thereof. In an exemplary embodiment, the communication component 816 receives a broadcast signal or broadcast-related information from an external broadcast management system by means of a broadcast channel. In an exemplary embodiment, the communication component 816 further includes a Near Field Communication (NFC) module to facilitate short-range communication. For example, the NFC module may be implemented based on Radio Frequency Identification (RFID) technology, Infrared Data Association (IrDA) technology, Ultra-Wideband (UWB) technology, Bluetooth (BT) technology, and other technologies.

In an exemplary embodiment, the electronic device 800 may be implemented by one or more Application-Specific Integrated Circuits (ASICs), Digital Signal Processors (DSPs), Digital Signal Processing Devices (DSPDs), Programmable Logic Devices (PLDs), Field-Programmable Gate Arrays (FPGAs), controllers, microcontrollers, microprocessors, or other electronic elements, to execute the method above.

In an exemplary embodiment, a non-volatile computer-readable storage medium is further provided, for example, a memory 804 including computer program instructions, which can executed by the processor 820 of the electronic device 800 to implement the methods above.

The present disclosure may be a system, a method, and/or a computer program product. The computer program product may include a computer readable storage medium having computer readable program instructions thereon for enabling a processor to implement aspects of the present disclosure. The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. More specific examples (a non-exhaustive list) of the computer readable storage medium include: a portable computer diskette, a hard disk, a Random Access Memory (RAM), an ROM, an EPROM (or a flash memory), a SRAM, a portable Compact Disk Read-Only Memory (CD-ROM), a Digital Versatile Disc (DVD), a memory stick, a floppy disk, a mechanically encoded device such as punch-cards or raised structure in a groove having instructions stored thereon, and any suitable combination thereof. A computer readable storage medium, as used herein, is not to be construed as being transitory signals per se, such as radio waves or other freely propagating electromagnetic waves, electromagnetic waves propagating by means of a waveguide or other transmission media (e.g., light pulses passing through a fiber-optic cable), or electrical signals transmitted by means of a wire.

Computer-readable program instructions described herein may be downloaded to respective computing/processing devices from the computer readable storage medium or to an external computer or external storage device by means of a network, for example, the Internet, a Local Area Network (LAN), a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer program instructions for performing operations of the present disclosure may be assembler instructions, Instruction-Set-Architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" language or similar programming languages. Computer readable program instructions may be executed completely on a user computer, executed partially on the user computer, executed as an independent software package, executed partially on the user computer and partially on a remote computer, or executed completely on the remote computer or server. In a scenario involving the remote computer, the remote computer may be connected to the user computer by means of any type of network, including a LAN or a Wide Area Network (WAN), or the connection may be made to an external computer (for example, connecting by using an Internet service provider by means of the Internet). In some embodiments, electronic circuitry including, for example, programmable logic circuitry, the FGPAs, or Programmable Logic Arrays (PLAs) may execute the computer readable program instructions by utilizing state information of the computer readable program instructions to personalize the electronic circuitry, so as to implement the aspects of the present disclosure.

The aspects of the present disclosure are described herein with reference to flowcharts and/or block diagrams of methods, apparatuses (systems), and computer program products according to the embodiments of the present disclosure. It should be understood that each block of the flowcharts and/or block diagrams, and combinations of the blocks in the flowcharts and/or block diagrams may be implemented by the computer readable program instructions.

These computer readable program instructions may be provided to a processor of a general-purpose computer, special-purpose computer, or other programmable data processing apparatus to produce a machine, such that the instructions, which execute by means of the processor of the computer or other programmable data processing apparatuses, create means for executing the functions/actions specified in one or more blocks of the flowcharts and/or block diagrams. These computer readable program instructions may also be stored in the computer readable storage medium, the instructions enable the computer, the programmable data processing apparatus, and/or other devices to function in a particular manner, so that the computer readable medium having instructions stored therein includes an article of manufacture including instructions which implement the aspects of the functions/actions specified in one or more blocks of the flowcharts and/or block diagrams.

The computer readable program instructions may also be loaded onto a computer, other programmable data processing apparatuses, or other devices to cause a series of operational steps to be performed on the computer, other programmable apparatuses or other devices to produce a computer implemented process, so that the instructions which execute on the computer, other programmable apparatuses or other devices implement the functions/actions specified in one or more blocks of the flowcharts and/or block diagrams.

The flowcharts and block diagrams in the accompanying drawings illustrate the architecture, functionality and operations of possible implementations of systems, methods, and computer program products according to multiple embodiments of the present disclosure. In this regard, each block in the flowchart or block diagram may represent a module, program segment, or portion of instruction, which includes one or more executable instructions for executing the specified logical function. In some alternative implementations, the functions noted in the block may also occur out of the order noted in the accompanying drawings. For example, two blocks shown in succession may, in fact, be executed substantially concurrently, or the blocks may sometimes be executed in the reverse order, depending upon the functionality involved. It should also be noted that each block of the block diagrams and/or flowcharts, and combinations of blocks in the block diagrams and/or flowcharts, may be implemented by special purpose hardware-based systems that perform the specified functions or actions or implemented by combinations of special purpose hardware and computer instructions. Without violating logics, different embodiments of the present application can be combined with one another; different embodiments emphasize different aspects; for parts which are not described in details, reference may be made to recitations of other embodiments.

The descriptions of the embodiments of the present disclosure have been presented for purposes of illustration, but are not intended to be exhaustive or limited to the embodiments disclosed. Many modifications and variations will be apparent to persons of ordinary skill in the art without departing from the scope and spirit of the described embodiments. The terminology used herein was chosen to best explain the principles of the embodiments, the practical application or technical improvement over technologies found in the marketplace, or to enable other persons of ordinary skill in the art to understand the embodiments disclosed herein.

The invention claimed is:

1. A dynamic action detection method, comprising:

adding an image frame in a video stream into a first queue with a length which is the minimum number of the image frames for dynamic action detection, to obtain the first queue of partially updated image frames, the number of added image frame being less than the length of the first queue;

detecting a dynamic action in the first queue of partially updated image frames;

determining that the dynamic action does not match with an action detection result, the action detection result comprising a previously detected action detection result; and updating the action detection result according to the dynamic action in response to the determination that the dynamic action does not match with the action detection result, wherein the action detection result comprises a static action, and adding the image frame in the video stream into the first queue, to obtain the first queue of partially updated image frames comprises:

obtaining a static action in an image frame to be identified in the video stream;

determining that the static action in the image frame to be identified does not match with the static action in the action detection result; and adding the image frame to be identified into the first queue in response to the determination that the static action in the image frame to be identified does not match with the static action in the action detection result, to obtain the first queue of partially updated image frames.

2. The method according to claim 1, wherein the previously detected action detection result is obtained by performing operations comprising:

determining that a dynamic action exists in the image frame of the first queue;

moving the image frame in the first queue into a second queue in response to the determination that the dynamic action exists in the image frame of the first queue; and determining the action detection result according to an image frame in the second queue.

3. The method according to claim 2, further comprising:

determining that the dynamic action detected according to the first queue of partially updated image frames does not match with the action detection result;

emptying the second queue and moving the image frame in the first queue into the second queue in response to the determination that the dynamic action detected according to the first queue of partially updated image frames does not match with the action detection result; and updating the action detection result according to a dynamic action in the image frame in the second queue.

4. The method according to claim 1, wherein the action detection result further comprises an action trajectory of the static action and/or switching information between static actions; and wherein adding the image frame in the video stream into the first queue, to obtain the first queue of partially updated image frames comprises:

determining that the static action in the image frame to be identified matches with the static action in the action detection result;

determining the action trajectory of the static action and/or switching information between the static action in the image frame to be identified according to the image frame to be identified and the image frame in the second queue in response to the determination that the static action in the image frame to be identified matches with the static action in the action detection result; and adding the image frame to be identified into the first queue in response to the determination that the action trajectory of the static action and/or switching information between the static actions in the image frame to be identified does not match with the action detection result, to obtain the first queue of partially updated image frames.

5. The method according to claim 4, further comprising:

determining that the action trajectory and/or switching information between static actions match with the action detection result; and adding the image frame to be identified into the second queue in response to the determination the action trajectory and/or switching information between static actions match with the action detection result.

6. The method according to claim 1, wherein the dynamic action comprises at least one static action and an action trajectory of the static action; and wherein detecting the dynamic action in the first queue of partially updated image frames comprises:

obtaining the dynamic action in the first queue of partially updated image frames according to the static action of each image frame in the first queue of partially updated image frames and the action trajectory of the static action in the each image frame.

7. The method according to claim 1, wherein the dynamic action comprises at least two static actions and switching information between the static actions; and wherein detecting the dynamic action in the first queue of partially updated image frames comprises:

obtaining the dynamic action in the first queue of partially updated image frames according to the static actions of each image frame in the first queue of partially updated image frames and the switching information between the static actions.

8. The method according to claim 1, wherein the dynamic action comprises at least two static actions, an action trajectory of each static action, and switching information between the static actions; and wherein detecting the dynamic action in the first queue of partially updated image frames comprises:

obtaining the dynamic action in the first queue of partially updated image frames according to the static actions of each image frame in the first queue of partially updated image frames, the action trajectory of the each static action, and the switching information between the static actions.

9. The method according to claim 1, wherein the dynamic action comprises a hand dynamic action, and the static action comprises a gesture; and wherein obtaining the static action in the image frame to be identified in the video stream comprises:

detecting whether the image frame to be identified comprises a hand;

determining that the image frame to be identified comprises the hand; and obtaining a gesture in the image frame to be identified according to fingers and/or a palm on the hand in response to the determination that the image frame to be identified comprises the hand.

10. The method according to claim 9, wherein obtaining the gesture in the image frame to be identified according to the fingers and/or the palm on the hand comprises:

identifying the gesture in the image frame to be identified according to a position of a first key point of the fingers on the hand and/or a position of a second key point of the palm; wherein the first key point of the fingers comprises a fingertip or a knuckle; the second key point of the palm comprises a point on a palm center, a palm back, or a palm edge.

11. The method according to claim 10, wherein the hand dynamic action further comprises an action trajectory and/or switching information between gestures; and wherein determining the action trajectory of the static action and/or the switching information between the static actions in the image frame to be identified according to the image frame to be identified and the image frame in the second queue further comprises:

determining the action trajectory of the static action and/or the switching information between the static actions in the image frame to be identified according to the first key point in the image frame to be identified and a first key point in the image frame in the second queue corresponding thereto; and/or determining the action trajectory of the static action and/or the switching information between the static actions in the image frame to be identified according to the second key point in the image frame to be identified and a second key point in the image frame in the second queue corresponding thereto.

12. The method according to claim 1, wherein the dynamic action comprises a static action and an action trajectory of the static action; and wherein detecting the dynamic action in the first queue of partially updated image frames comprises:

detecting the static action in the image frame in the first queue;

calculating an accumulated movement distance of a static action in a target image frame in an X axial direction and a Y axial direction with respect to the static action in a first image frame in the first queue; the target image frame comprising any image frame in the first queue except the first image frame; and obtaining the dynamic action in the image frame in the first queue according to the static action in the target image frame and the accumulated movement distance.

13. The method according to claim 12, wherein obtaining the dynamic action in the image frame in the first queue according to the static action in the target image frame and the accumulated movement distance comprises:

determining that the accumulated movement distance of the static action in the target image frame is less than a movement threshold; and determining the dynamic action of the target object in the image frame in the first queue to be a discontinuous action in response to the determination that the accumulated movement distance of the static action in the target image frame is less than a movement threshold.

14. The method according to claim 12, wherein obtaining the dynamic action in the image frame in the first queue according to the static action in the target image frame and the accumulated movement distance comprises:

determining that the accumulated movement distance is greater than or equal to a movement threshold;

calculating a ratio of the accumulated movement distance of the static action in each image frame with respect to the width of the target object to which the static action belongs in response to the determination that the accumulated movement distance is greater than or equal to a movement threshold;

determining that the ratio is less than a ratio threshold;

determining the action trajectory of the static action in the target image frame as a rotational action trajectory in response to the determination that the ratio is less than the ratio threshold; and obtaining the dynamic action in the image frame in the first queue according to the static action in the target image frame and the rotational action trajectory.

15. An electronic device, comprising:

a processor; and a memory configured to store processor-executable instructions;

wherein the processor is configured to invoke the instructions stored in the memory, so as to:

add an image frame in a video stream into a first queue with a length which is the minimum number of the image frames for dynamic action detection, to obtain the first queue of partially updated image frames, the number of added image frame being less than the length of the first queue;

detect a dynamic action in the first queue of partially updated image frames;

determining that the dynamic action does not match with an action detection result, the action detection result comprising a previously detected action detection result; and update the action detection result according to the dynamic action in response to the determination that the dynamic action does not match with the action detection result, wherein the action detection result comprises a static action, and adding the image frame in the video stream into the first queue, to obtain the first queue of partially updated image frames comprises:

obtaining a static action in an image frame to be identified in the video stream;

determining that that the static action in the image frame to be identified does not match with the static action in the action detection result; and adding the image frame to be identified into the first queue in response to the determination that the static action in the image frame to be identified does not match with the static action in the action detection result, to obtain the first queue of partially updated image frames.

16. A non-transitory computer readable storage medium, having computer program instructions stored thereon, wherein when the computer program instructions are executed by a processor, the processor is caused to perform the operations of:

adding an image frame in a video stream into a first queue with a length which is the minimum number of the image frames for dynamic action detection, to obtain the first queue of partially updated image frames, the number of added image frame being less than the length of the first queue:

detecting a dynamic action in the first queue of partially updated image frames:

determining that the dynamic action does not match with an action detection result, the action detection result comprising a previously detected action detection result, the action detection result comprising a previously detected action detection result; and updating the action detection result according to the dynamic action in response to the determination that the dynamic action does not match with the action detection result, wherein the action detection result comprises a static action, and adding the image frame in the video stream into the first queue, to obtain the first queue of partially updated image frames comprises:

obtaining a static action in an image frame to be identified in the video stream;

determining that that the static action in the image frame to be identified does not match with the static action in the action detection result; and adding the image frame to be identified into the first queue in response to the determination that the static action in the image frame to be identified does not match with the static action in the action detection result, to obtain the first queue of partially updated image frames.

17. The electronic device of claim 15, wherein the previously detected action detection result is obtained by performing operations comprising:

determining that a dynamic action exists in the image frame of the first queue;

moving the image frame in the first queue into a second queue in response to the determination that the dynamic action exists in the image frame of the first queue; and determining the action detection result according to an image frame in the second queue.

18. The electronic device of claim 15, wherein the action detection result further comprises an action trajectory of the static action and/or switching information between static actions; and wherein adding the image frame in the video stream into the first queue, to obtain the first queue of partially updated image frames comprises:

determining that the static action in the image frame to be identified matches with the static action in the action detection result;

determining the action trajectory of the static action and/or switching information between the static action in the image frame to be identified according to the image frame to be identified and the image frame in the second queue in response to the determination that the static action in the image frame to be identified matches with the static action in the action detection result;

determining that that the action trajectory of the static action and/or switching information between the static actions in the image frame to be identified does not match with the action detection result; and adding the image frame to be identified into the first queue in response to the determination that the action trajectory of the static action and/or switching information between the static actions in the image frame to be identified does not match with the action detection result, to obtain the first queue of partially updated image frames.

19. The non-transitory computer readable storage medium of 16, wherein the previously detected action detection result is obtained by performing operations comprising:

determining that a dynamic action exists in the image frame of the first queue;

moving the image frame in the first queue into a second queue in response to the determination that a dynamic action exists in the image frame of the first queue; and determining the action detection result according to an image frame in the second queue.

20. The non-transitory computer readable storage medium of 16, wherein the action detection result further comprises an action trajectory of the static action and/or switching information between static actions; and wherein adding the image frame in the video stream into the first queue, to obtain the first queue of partially updated image frames comprises:

determining that the static action in the image frame to be identified matches with the static action in the action detection result;

determining the action trajectory of the static action and/or switching information between the static action in the image frame to be identified according to the image frame to be identified and the image frame in the second queue in response to the determination that the static action in the image frame to be identified matches with the static action in the action detection result;

determining that that the action trajectory of the static action and/or switching information between the static actions in the image frame to be identified does not match with the action detection result; and adding the image frame to be identified into the first queue in response to the determination that the action trajectory of the static action and/or switching information between the static actions in the image frame to be identified does not match with the action detection result, to obtain the first queue of partially updated image frames.

* * * * *